(12) United States Patent
Letcher

(10) Patent No.: US 8,029,650 B1
(45) Date of Patent: Oct. 4, 2011

(54) ANTIFREEZE RECYCLING SYSTEMS

(76) Inventor: Dale L. Letcher, Peoria, AZ (US)

( * ) Notice: Subject to any disclaimer, the term of this patent is extended or adjusted under 35 U.S.C. 154(b) by 1010 days.

(21) Appl. No.: 11/862,019

(22) Filed: Sep. 26, 2007

Related U.S. Application Data

(60) Provisional application No. 60/827,035, filed on Sep. 26, 2006.

(51) Int. Cl.
*B01D 3/02* (2006.01)
*B01D 3/10* (2006.01)
*B01D 3/34* (2006.01)
*B08B 7/04* (2006.01)
*C07C 27/28* (2006.01)
*C07C 29/80* (2006.01)
*C07C 29/94* (2006.01)

(52) U.S. Cl. ............ 203/18; 134/12; 134/21; 159/47.1; 203/7; 203/55; 203/79; 203/87; 203/92; 203/96; 210/737; 210/738; 210/774; 210/806; 568/868; 568/916

(58) Field of Classification Search .................. 159/33, 159/42, 47.1, DIG. 20, DIG. 23; 203/7, 18, 203/55, 79, 87, 92, 96, DIG. 7, DIG. 13; 134/10, 12, 21; 210/737–739, 767, 774, 210/776, 799, 806; 568/868, 916
See application file for complete search history.

(56) References Cited

U.S. PATENT DOCUMENTS

| | | | | |
|---|---|---|---|---|
| 5,223,144 A | * | 6/1993 | Woyciesjes et al. | 210/664 |
| 5,422,008 A | * | 6/1995 | Woyciesjes et al. | 210/662 |
| 5,820,752 A | * | 10/1998 | Berke et al. | 210/221.2 |
| 5,882,486 A | | 3/1999 | Moore, Jr. | |
| 5,922,198 A | * | 7/1999 | Kelly et al. | 210/241 |
| 6,080,280 A | | 6/2000 | Moore, Jr. | |
| 6,187,197 B1 | | 2/2001 | Haddock | |
| 6,265,625 B1 | * | 7/2001 | Vansant et al. | 568/868 |
| 2003/0066791 A1 | * | 4/2003 | Yaegashi et al. | 210/167 |
| 2003/0209257 A1 | * | 11/2003 | Hebert | 134/10 |

FOREIGN PATENT DOCUMENTS

DE 3534603 * 4/1987

OTHER PUBLICATIONS

Perry et al , "Technique of Organic Chemistry", Distillation, Aug. 25, 1965, vol. IV, pp. 2, 4 and 559.*

* cited by examiner

*Primary Examiner* — Virginia Manoharan
(74) *Attorney, Agent, or Firm* — Stoneman Law Patent Group; Martin L. Stoneman

(57) ABSTRACT

A method for purifying used antifreeze is disclosed. An antifreeze recycling systems uses a simple-distillation apparatus adapted to distill clean antifreeze from used antifreeze. A novel scraper blade is used in the simple-distillation apparatus. Also, antifreeze recycling methods that minimize waste and generate nontoxic, landfillable waste are provided. An antifreeze product produced by the present method, and a nontoxic, landfillable sludge product produced by the present method, are disclosed.

34 Claims, 9 Drawing Sheets

ANTIFREEZE RECYCLING SYSTEMS

CROSS-REFERENCE TO RELATED APPLICATION

The present application is related to and claims priority from prior provisional application Ser. No. 60/827,035, filed Sep. 26, 2006, entitled "Antifreeze Recycling Systems", the content of which is incorporated herein by this reference and is not admitted to be prior art with respect to the present invention by the mention in this cross-reference section.

BACKGROUND

The present invention relates to antifreeze recycling systems. The present invention further relates to a simple-distillation apparatus adapted to distill clean antifreeze from used antifreeze. More particularly, the present invention relates to antifreeze recycling methods that minimize waste. Further, the present invention relates to antifreeze methods systems that generate nontoxic, landfillable waste. Also, the present invention relates to an antifreeze boiler comprising a scraper blade to scrape antifreeze sludge from the side of the antifreeze boiler. In addition, the present invention relates to an antifreeze product produced by the present method. Also, the present invention relates to a nontoxic, landfillable sludge product produced by the present method.

No system exists that provides a simple-distillation apparatus and method that generates clean, reusable antifreeze and nontoxic, landfillable waste. Also, no system exists that provides a scraper blade to remove antifreeze sludge from the sides of an antifreeze distillation boiler. In addition, no system provides a method that generates nontoxic, landfillable sludge instead of hazardous liquid waste.

Therefore, a need exists for a simple-distillation apparatus and method that generates clean, reusable antifreeze and nontoxic, landfillable waste. Also, a need exists for a scraper blade specially adapted to remove antifreeze sludge from the sides of a boiler. In addition, a need exists for a method that generates nontoxic, landfillable sludge instead of hazardous liquid waste.

OBJECTS AND FEATURES OF THE INVENTION

A primary object and feature of the present invention is to provide antifreeze recycling systems.

It is a further object and feature of the present invention to provide such a system comprising a simple-distillation apparatus and method that generates clean, reusable antifreeze and nontoxic, landfillable waste. It is another object and feature of the present invention to provide such a system comprising a scraper blade to remove antifreeze sludge from the sides of a boiler. It is yet another object and feature of the present invention to provide a system comprising a method of recycling glycol antifreeze that generates nontoxic, landfillable sludge instead of hazardous liquid waste.

It is a further object and feature of the present invention to provide such a system comprising a recycled antifreeze product. It is a further object and feature of the present invention to provide such a system comprising a nontoxic, landfillable sludge.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a method, relating to purifying used antifreeze comprising glycol, water, additives, and impurities, comprising the steps of: applying heat to at least one boiler; applying vacuum to such at least one boiler; adding used antifreeze to such at least one boiler; boiling off water from such used antifreeze into at least one first tank; boiling off water and glycol from such used antifreeze into at least one second tank; shutting off the supply of used antifreeze into such boiler; boiling off additional water and glycol from such used antifreeze into such at least one second tank, while simultaneously scraping at least one inside surface of such at least one boiler, until such impurities are concentrated into thick liquid; releasing such at least one vacuum from such at least one boiler; dumping such impurities from such at least one boiler; and allowing such impurities to cool to ambient temperature, whereby at least one nontoxic, landfillable sludge is formed.

Moreover, it provides such a method, further comprising the step of opening at least one port at the bottom of such at least one boiler prior to such step of dumping such impurities from such at least one boiler. Additionally, it provides such a method, further comprising the step of shutting off such supply of heat to such at least one boiler before such step of dumping such impurities from such at least one boiler. Also, it provides such a method, further comprising the step of certifying such at least one nontoxic, landfillable sludge as nontoxic waste. In addition, it provides such a method, further comprising the step of certifying such at least one nontoxic, landfillable sludge as landfillable waste. And, it provides such a method, further comprising the step of disposing of such at least one nontoxic, landfillable sludge in at least one landfill. Further, it provides such a method, further comprising the step of disposing of such at least one nontoxic, landfillable sludge in at least one public landfill.

Even further, it provides such a method, further comprising the step of converting such water and glycol from such at least one second tank into sellable antifreeze. Moreover, it provides such a method, further comprising the step of adding water to such water and glycol from such at least one second tank to generate a mixture comprising about fifty volume percent water and about fifty volume percent glycol. Additionally, it provides such a method, further comprising the step of adding at least one anti-corrosion additive to such mixture.

Also, it provides such a method, wherein such step of adding used antifreeze to such at least one boiler occurs during such step of boiling off water from such used antifreeze into at least one first tank and during such step of boiling off water and glycol from such used antifreeze into at least one second tank. In addition, it provides such a method, wherein such step of boiling off water from such used antifreeze into at least one first tank is performed while distilled water, and not glycol, is evaporating from such used antifreeze. And, it provides such a method, wherein such step of boiling off water from such used antifreeze into at least one first tank is performed for about eight hours. Further, it provides such a method, wherein such step of boiling off water and glycol from such used antifreeze into at least one second tank is performed while water and glycol are both evaporating from such used antifreeze.

Even further, it provides such a method, wherein such step of boiling off water and glycol from such used antifreeze into at least one second tank is performed for about sixty hours. Moreover, it provides such a method, wherein such step of dumping such impurities from such at least one boiler occurs while such impurities are about three hundred forty-five degrees Fahrenheit. Additionally, it provides such a method, wherein such step of applying vacuum to such at least one boiler comprises the step of applying between about six hundred millibars and about eight hundred millibars of vacuum to such at least one boiler. Also, it provides such a method, wherein such step of applying vacuum to such at least one boiler comprises the step of applying about eight hundred millibars of vacuum to such at least one boiler. In addition, it provides such a method, wherein such step of boiling off water from such used antifreeze into at least one first tank is performed until such used antifreeze in such boiler under such vacuum reaches a temperature of about two hundred thirty-five degrees Fahrenheit.

And, it provides such a method, wherein such step of boiling off water and glycol from such used antifreeze into at least one second tank is performed after such used antifreeze in such boiler under such vacuum reaches a temperature of about two hundred thirty-five degrees Fahrenheit. Further, it provides such a method, wherein such step of boiling off water and glycol from such used antifreeze into at least one second tank is performed until such used antifreeze in such boiler under such vacuum reaches a temperature of about two hundred fifty-five degrees Fahrenheit. Even further, it provides such a method, wherein such step of boiling off additional water and glycol from such used antifreeze into such at least one second tank until such impurities are concentrated into thick liquid is performed in such boiler under such vacuum between about three hundred twenty-five degrees Fahrenheit and about three hundred forty-five degrees Fahrenheit. Moreover, it provides such a method, further comprising the step of filtering such used antifreeze prior to such step of adding used antifreeze to such at least one boiler. Additionally, it provides such a method, further comprising the step of settling such used antifreeze prior to such step of adding used antifreeze to such at least one boiler.

Also, it provides such a method, further comprising the step of carbon-filtering such water and glycol from such second tank. In addition, it provides such a method, wherein such step of adding used antifreeze to such at least one boiler and such step of dumping such at least one nontoxic, landfillable sludge from such at least one boiler occur about three days apart. And, it provides such a method, further comprising the step of reducing the amount of glycol lost in-process to less than about one percent of the volume of such used antifreeze. Further, it provides such a method, further comprising the step of generating a volume of such at least one nontoxic, landfillable sludge that is less than four percent of the volume of such used antifreeze.

Even further, it provides such a method, further comprising the step of intermittently scraping the inside surface of such at least one boiler while heat is being applied to such at least one boiler. Moreover, it provides such a method, further comprising the step of continuously scraping the inside surface of such at least one boiler while heat is being applied to such at least one boiler.

Additionally, it provides such a method, further comprising the steps of: settling such used antifreeze prior to such step of adding used antifreeze to such at least one boiler; disposing of such at least one nontoxic, landfillable sludge in at least one landfill; carbon-filtering such water and glycol from such second tank; and converting such water and glycol from such at least one second tank into sellable antifreeze; wherein such step of adding used antifreeze to such at least one boiler occurs during such step of boiling off water from such used antifreeze into at least one first tank and during such step of boiling off water and glycol from such used antifreeze into at least one second tank; wherein such step of boiling off water from such used antifreeze into at least one first tank is performed while distilled water, and not glycol, is evaporating from such used antifreeze; wherein such step of boiling off water and glycol from such used antifreeze into at least one second tank is performed while water and glycol are both evaporating from such used antifreeze; wherein such step of boiling off additional water and glycol from such used antifreeze into such at least one second tank until such impurities are concentrated into thick liquid is performed in such boiler under such vacuum between about three hundred twenty-five degrees Fahrenheit and about three hundred forty-five degrees Fahrenheit; wherein such step of dumping such impurities from such at least one boiler occurs while such impurities are about three hundred forty-five degrees Fahrenheit.

Also, it provides such a product manufactured by the process.

In addition, it provides such a nontoxic, landfillable sludge manufactured by the process.

In accordance with another preferred embodiment hereof, this invention provides a distillation method, relating to purifying used antifreeze comprising glycol, water, additives, and impurities, comprising the steps of: applying heat to at least one distillation boiler; adding used antifreeze to such at least one distillation boiler; boiling off additional water and glycol from such used antifreeze into such at least one second tank, while simultaneously scraping at least one inside surface of such at least one boiler, until such impurities are concentrated into thick liquid; removing such at least one thick liquid from such at least one distillation boiler; and cooling such at least one thick liquid to generate at least one nontoxic, landfillable sludge.

In accordance with another preferred embodiment hereof, this invention provides a distillation method, relating to purifying used antifreeze comprising glycol, water, additives, and impurities, comprising the steps of: distilling such used antifreeze, in at least one simple-distillation apparatus comprising at least one boiler, until substantially all glycol is distilled from such impurities; scraping the inside surface of such at least one boiler during such distillation; and allowing such impurities to cool to ambient temperature, whereby at least one nontoxic, landfillable sludge is formed.

And, it provides such a method, further comprising the step of collecting at least one first distillate comprising less than about 45 percent glycol and comprising more than about 55 percent water. Further, it provides such a method, further comprising the step of collecting at least one second distillate comprising less than about 45 percent water and comprising more than about 55 percent glycol. Even further, it provides such a method, further comprising the steps of: collecting at least one first distillate comprising less than about 45 percent glycol and comprising more than about 55 percent water; collecting at least one second distillate comprising less than about 45 percent water and comprising more than about 55 percent glycol; and mixing such at least one first distillate and such at least one second distillate to generate at least one third distillate. Even further, it provides such a method, wherein such at least one third distillate comprises about 50 percent water and comprises about 50 percent glycol. Even further, it provides such a method, wherein such at least one third distillate comprises less than about 60 percent water and comprises more than about 40 percent glycol.

In accordance with another preferred embodiment hereof, this invention provides a distillation method, relating to purifying used antifreeze comprising glycol, water, additives, and impurities, comprising the steps of: distilling such used antifreeze, at about 800 millibars pressure, to about three hundred forty-five degrees Fahrenheit, in at least one simple-distillation apparatus comprising at least one boiler; scraping the inside surface of such at least one boiler during such distillation; and allowing such impurities to cool to ambient temperature, whereby at least one nontoxic, landfillable sludge is formed.

DETAILED DESCRIPTION OF THE BEST MODES AND PREFERRED EMBODIMENTS OF THE INVENTION

Figure 1:
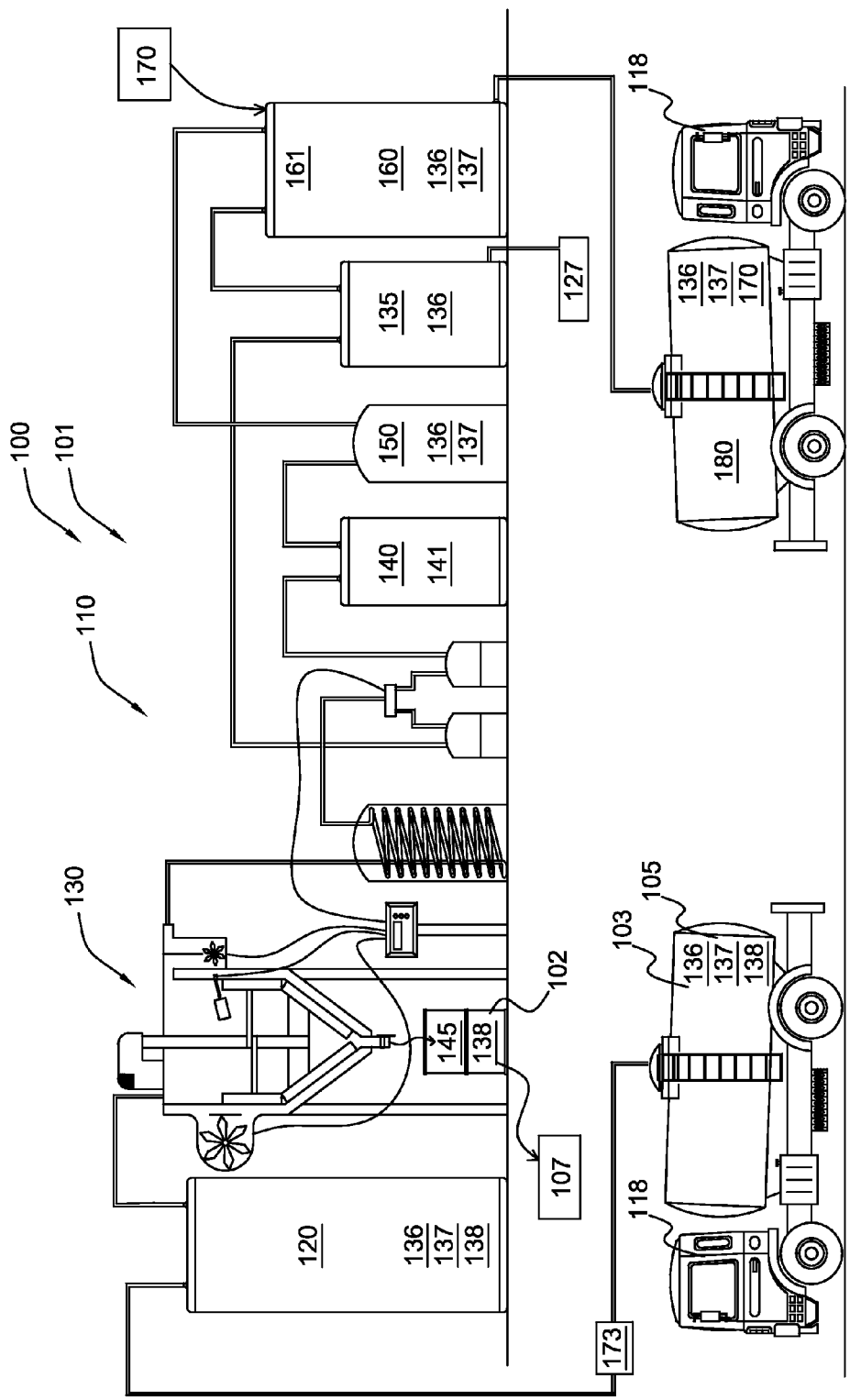
FIG. 1 shows a diagram illustrating a glycol recycling system according to a preferred embodiment of the present invention.

FIG. 1 shows a diagram illustrating glycol recycling system 100 according to a preferred embodiment of the present invention. Preferably, glycol recycling system 100 is adapted to recycle used glycol antifreeze (either propylene glycol or ethylene glycol based, preferably ethylene glycol/water antifreeze) into new glycol antifreeze (defined as meeting the technical specifications for the composition of new antifreeze). Preferably, glycol recycling system 100 comprises glycol distillation system 101, as shown. Preferably, glycol distillation system 101 produces new antifreeze 180, and nontoxic, landfillable sludge 102, from used antifreeze 105, as shown. Preferably, used antifreeze 105 comprises glycol-based antifreeze 103, as shown. Preferably, glycol-based antifreeze 103 comprises ethylene glycol based antifreeze and/or propylene glycol based antifreeze. Most preferably, glycol-based antifreeze 103 comprises ethylene glycol 137 and water 136. Upon reading the teachings of this specification, those with ordinary skill in the art will now understand that, under appropriate circumstances, considering such issues as advances in technology, user preference, etc., other antifreezes, such as glycerin, methanol, ethanol, etc., may suffice for distillation.

In the United States of America, waste may be considered a hazardous waste if it exhibits one of the four characteristics defined in 40 CFR Part 261 Subpart C, namely, ignitability (D001), corrosivity (D002), reactivity (D003), and toxicity (D004-D043):

Ignitability—Ignitable wastes can create fires under certain conditions, are spontaneously combustible, or have a flash point less than 60° C. (140° F.). Examples include waste oils and used solvents. For more details, see 40 CFR §261.21. Test methods that may be used to determine ignitability include the Pensky-Martens Closed-Cup Method for Determining Ignitability (Method 1010a), the Setaflash Closed-Cup Method for Determining Ignitability (Method 1020b), and the Ignitability of Solids (Method 1030).

Corrosivity—Corrosive wastes are acids or bases (pH less than or equal to 2, or greater than or equal to 12.5) that are capable of corroding metal containers, such as storage tanks, drums, and barrels. Battery acid is an example. For more details, see 40 CFR §261.22. The test method that may be used to determine corrosivity is the Corrosivity Towards Steel (Method 1110a).

Reactivity—Reactive wastes are unstable under "normal" conditions. They can cause explosions, toxic fumes, gases, or vapors when heated, compressed, or mixed with water. Examples include lithium-sulfur batteries and explosives. For more details, see 40 CFR §261.23.

Toxicity—Toxic wastes are harmful or fatal when ingested or absorbed (e.g., containing mercury, lead, etc.). When toxic wastes are land disposed, contaminated liquid may leach from the waste and pollute ground water. Toxicity is defined through a laboratory procedure called the Toxicity Characteristic Leaching Procedure (TCLP) (Method 1311). The TCLP helps identify wastes likely to leach concentrations of contaminants that may be harmful to human health or the environment. For more details, see 40 CFR §261.24.

Preferably, nontoxic, landfillable sludge 102 is not ignitable, corrosive, reactive, or toxic according to the above definitions. Because modern automotive coolant systems no longer use lead solder, nontoxic, landfillable sludge 102 is typically free of lead contamination. Preferably, nontoxic, landfillable sludge 102 has lead levels less than about 50 ppm. More preferably, nontoxic, landfillable sludge 102 has lead levels less than about 5 ppm. Further, nontoxic, landfillable sludge 102 preferably passes the common "paint filter" test used in many municipal landfills to distinguish liquid wastes (which are not allowed) from solid wastes (which are permitted if they are also non-hazardous). Preferably, nontoxic, landfillable sludge 102 is solid and does not flow through a paint filter (or coffee filter).

Antifreeze recycling waste has in the past comprised a toxic liquid containing ethylene glycol which requires expensive hazardous waste disposal in some states. Further, the ethylene glycol remaining in the prior art toxic liquid represents lost profits from ethylene glycol that could not be recycled, often up to ten percent of the input stream. Nontoxic, landfillable sludge 102 of the present invention is a nontoxic solid sludge with no residual ethylene glycol content. Generating nontoxic, landfillable sludge 102 eliminates hazardous waste disposal costs and increases profits by increasing the percentage of ethylene glycol that is recycled and resold.

Preferably, glycol recycling system 100 comprises distillery 110, as shown. Preferably, distillery 110 comprises source tank 120, simple-distiller 130 (shown in cross-section), water tank 135, recovered antifreeze tank 140, and sludge tank 145, as shown. Preferably, distillery 110 comprises carbon filter 150, as shown. Preferably, distillery 110 comprises makeup tank 160, as shown. Optionally, distillery 110 comprises particle filter 173, as shown.

Preferably, used antifreeze 105 is trucked to distiller 110 from sources, such as, for example, auto recyclers, auto repair shops, etc. Preferably, used antifreeze 105 comprises water 136, glycol 137, and impurities 138, as shown. Preferably, glycol 137 comprises propylene glycol, ethylene glycol, triethylene glycol, dipropylene glycol, 1,3-propanediol, and/or other glycols. Preferably, used antifreeze 105 is transferred from truck 118, preferably through particle filter 173, into source tank 120, as shown. If particle filter 173 is not used, then used antifreeze 105 is preferably allowed to settle prior to pumping used antifreeze 105 into source tank 120 in order to prevent large particles of impurities from being pumped into source tank 120. Preferably, used antifreeze 105 is then processed through simple-distiller 130 to generate water 136 in water tank 135, recovered antifreeze 141 (comprising water 136 and glycol 137) in recovered antifreeze tank 140, and nontoxic, landfillable sludge 102 in sludge tank 145, as shown. Preferably, nontoxic, landfillable sludge 102 substantially comprises concentrated impurities 138 without any significant quantities of water 136 or glycol 137.

Preferably, recovered antifreeze 141 is transferred, preferably through carbon filter 150, into makeup tank 160, as shown. Preferably, carbon filter 150 comprises activated charcoal (preferably 10×20 mesh coal) which removes any residual impurities 138 resulting in a water-clear mixture of water 136 and glycol 137. Preferably, water 136 is transferred from water tank 135 into makeup tank 160 to generate glycol mix 161, as shown. Preferably, glycol mix 161 comprises about fifty percent water 136 and about fifty percent glycol 137. Preferably, addpack 170 is added to glycol mix 161 to generate new antifreeze 180, as shown. Preferably, addpack 170 comprises anticorrosives adapted to protect the metals of the coolant system of a vehicle that new antifreeze 180 will be used in.

Applicant's testing, through authorized testing labs, has demonstrated that new antifreeze 180 meets preferred ASTM standard testing requirements. New antifreeze 180, as shown in Table 2 below, meets the requirements provided by ASTM D6471, a standard specification for prediluted recycled ethylene glycol base engine coolant concentrate for use in automobiles and light-duty vehicles, as shown below. Also, new antifreeze 180 meets the requirements provided by ASTM D6210, a standard specification detailing the requirements for fully formulated glycol based coolants for cooling systems. Typically, coolant concentrates that meet the requirements of ASTM D6471 do not require any addition of Supplemental Coolant Additive (SCA) until the first maintenance interval when a maintenance dose of SCA is required to continue protection in certain heavy duty engine cooling systems (particularly those of the wet cylinder liner-in-block design). New antifreeze 180 comprises an ethylene-glycol-based antifreeze that meets the requirements of the Maintenance Council of the American Trucking Association (TMC) RP-329 specification, as shown in the below Tables. Results of testing of new antifreeze 180 that comply with ASTM D6210 and ASTM D6471 are shown below in Table 2. Meeting the requirements of standard specifications is useful in that consumers will feel confident using new antifreeze 180. Further, such requirements may preferably be certified so that packaged new antifreeze 180 may be labeled as certified by meeting the requirements of industry standard specifications. Preferably, the within described processes for producing new antifreeze 180 are implemented according to the within teachings to produce a product meeting all the above standards.

Preferably, new antifreeze 180 (at least embodying herein an antifreeze manufactured by the process) is then trucked (or piped, etc.) to end users, such as, for example, antifreeze bottlers, auto recyclers, auto repair shops, fleet maintenance, original equipment manufacturers, etc. Preferably, unused water 136 (which is distilled water) is dumped to sewer 127, as shown, or is diverted for other uses, such as for cooling tower use. Preferably, nontoxic, landfillable sludge 102 (at least embodying herein a nontoxic, landfillable sludge manufactured by the process) is advantageously disposed of in local landfill 107, as shown. Landfillable sludge 102 has been certified as nontoxic by environmental testing, as shown in Table 5. This is advantageous since one result of the recycling process is an easily disposable product that reduces disposal costs.

Figure 2:
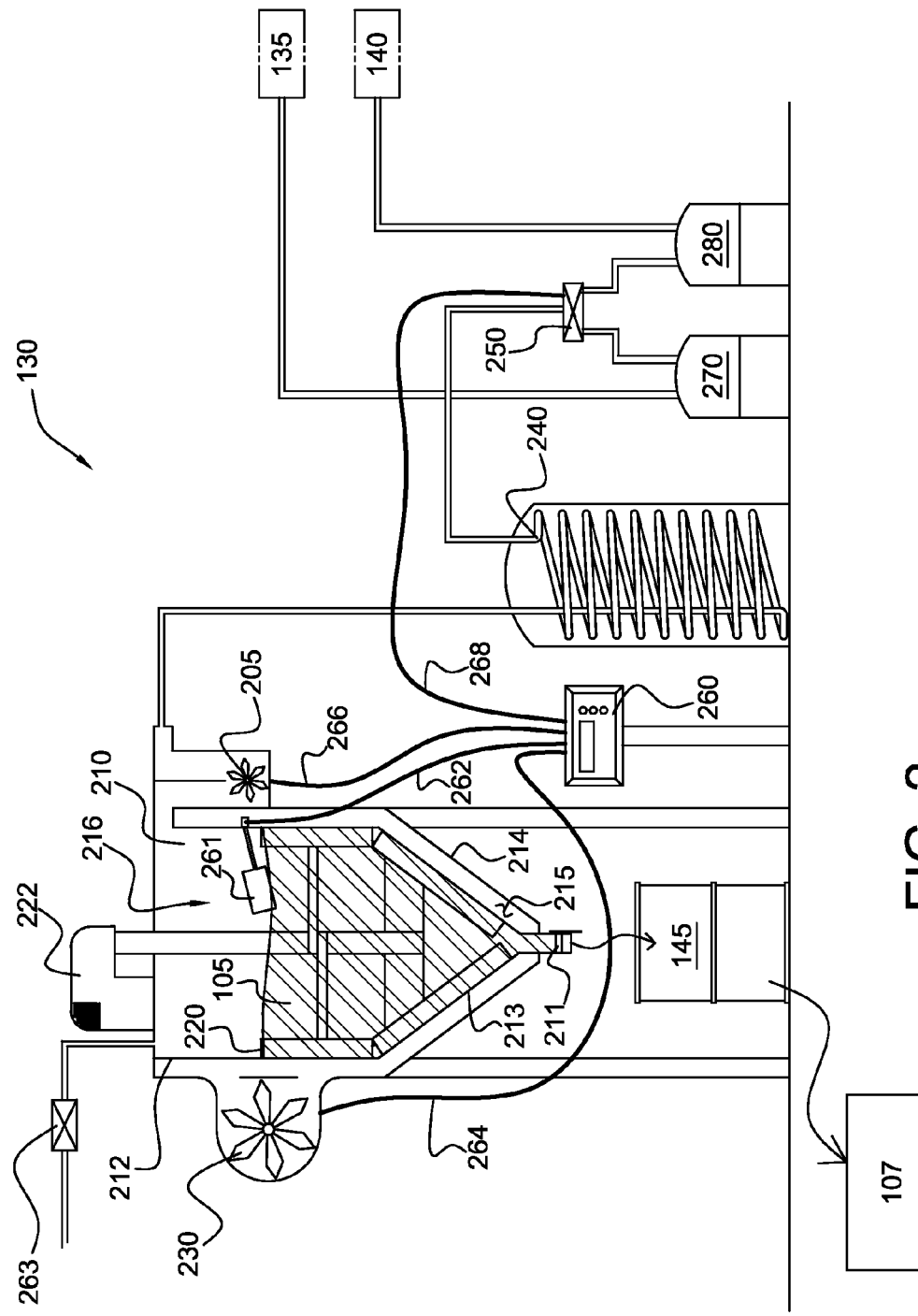
FIG. 2 shows a front view illustrating the boiler according to the preferred embodiment of FIG. 1.

FIG. 2 shows a front view illustrating simple-distiller 130 according to the preferred embodiment of FIG. 1. Preferably, simple-distiller 130 comprises vacuum 205, boiler 210 (shown in cross-section), scraper blade 220, heater 230, condenser 240, switch 250, and controller 260, as shown. Preferably, simple-distiller 130 comprises water tank 270 and recovered antifreeze tank 280, as shown. Preferably, water tank 270 feeds into water tank 135, as shown, and provides a storage buffer in case of contamination. Preferably, recovered antifreeze tank 280 feeds into recovered antifreeze tank 140, as shown, and provides a storage buffer in case of contamination.

Preferably, vacuum 205 removes gas from boiler 210 and sends such gas through condenser 240, as shown. Preferably, condenser 240 condenses the gas into liquid which is directed into switch 250, as shown. Preferably, switch 250 directs the output of condenser 240 between water tank 270 (early in the distillation process when only distilled water 136 is evolved) and recovered antifreeze tank 280 (later in the distillation process when both water 136 and glycol 137 are evolved), as shown.

Preferably, boiler 210 comprises a steel boiler (preferably stainless steel), preferably having cylindrical sides 212, conical bottom 213, and drain port 211, as shown. Preferably, boiler 210 comprises heat jacket 214, as shown. Preferably, heat jacket 214 comprises a steel jacket around boiler 210 which defines space 215 between boiler 210 and heat jacket 214, as shown. Preferably, heater 230 directs hot air, flames, hot heat transfer fluid, etc., depending on the particular boiler design, into space 215 to heat boiler 210, as shown.

Preferably, scraper blade 220 sweeps the inside surface 216 of boiler 210, as shown. Preferably, impurities 138 deposit on inside surface 216 during distillation. Impurities 138 insulate against heat transfer into boiler 210, so scraper blade 220 sweeps impurities 138 off of inside surface 216 onto scraper blade 220 in order to prevent impurities 138 from building up on inside surface 216. Preferably, impurities 138 either flow to the bottom of boiler 210 or are re-dissolved in used antifreeze 105. Preferably, scraper blade 220 comprises motor 222, as shown. Preferably, motor 222 turns scraper blade 220 constantly or intermittently during distillation and while impurities 138 are being dumped. Preferably, motor 222 turns scraper blade 220 for about two minutes and then stops for about ten minutes during distillation.

Preferably, controller 260 comprises level controller 262, temperature controller 264, vacuum controller 266, and flow controller 268, as shown.

Preferably, used antifreeze 105 is added to boiler 210 in response to level controller 262. Preferably, level controller 262 senses the level of used antifreeze 105 in boiler 210. Preferably, level controller 262 opens and closes valve 263 to permit used antifreeze 105 to be vacuum-pulled (or pumped) into boiler 210 when the level of used antifreeze 105 in boiler 210 reaches a predetermined low level. Preferably, level controller 262 closes valve 263 when the predetermined high level of used antifreeze 105 in boiler 210 is reached. Preferably, level controller 262 comprises at least one float sensor 261, as shown.

Preferably, temperature controller 264 activates and deactivates heater 230 to maintain the correct temperature of used antifreeze 105 in boiler 210. Preferably, temperature controller 264 maintains used antifreeze 105 at the boiling point of used antifreeze 105 during distillation. The boiling point of used antifreeze 105 varies with the amount of vacuum applied to boiler 210 and varies with the proportion of water 136 to glycol 137 in boiler 210 at various points in the distillation process. Preferably, at about eight hundred millibars vacuum, used antifreeze boils at about one hundred thirty-eight degrees Fahrenheit at the beginning of distillation (for 30% ethylene glycol with 70% water), increasing to about three hundred forty-five degrees Fahrenheit when nontoxic, landfillable sludge 102 is dumped at the end of the distillation process.

Preferably, vacuum controller 266 permits the user to set the vacuum pressure maintained in boiler 210. Applying vacuum to boiler 210 lowers the boiling point of used antifreeze 105. Lowering the boiling point of used antifreeze 105 promotes fuel efficiency by reducing the amount of heat required from heater 230. Lowering the boiling point of used antifreeze 105 also helps to prevent glycol 137 from polymerizing or experiencing other side reactions during distillation. Preferably, vacuum controller 266 maintains the vacuum within boiler 210 between about 550 millibars and about 850 millibars. More preferably, vacuum controller 266 maintains the vacuum within boiler 210 between about 600 millibars and about 800 millibars. Most preferably, vacuum controller 266 maintains the vacuum within boiler 210 at about 800 millibars. Preferably, particularly if antifreeze 105 is foaming, vacuum controller 266 maintains the vacuum within boiler 210 at about 600 millibars (causing associated changes in distillation times and temperatures).

Preferably, controller 260 coordinates the activities of level controller 262, temperature controller 264, flow controller 268 (which controls switch 250). Preferably, under preferred operating conditions at about 800 millibars pressure, flow controller 268 directs switch 250 to direct the condensate from condenser 240 into water tank 270 for about the first eight hours of the distillation cycle. Preferably, under preferred operating conditions at about 800 millibars pressure, flow controller 268 directs switch 250 to direct the condensate from condenser 240 into recovered antifreeze tank 280 for about the next sixty hours of the distillation cycle. Preferably, after about 68 total hours, flow controller 268 overrides level controller 262 and shuts off the input of additional used antifreeze 105. Preferably, the remaining water 136, glycol 137, and impurities 138 are distilled to reduce the volume until substantially no glycol 137 remains in impurities 138. Preferably, impurities 138 are kept soft by stirring with scraper blade 220 during this reduction phase of the distillation process. Preferably, impurities 138 are then dumped out of boiler 120 and harden into nontoxic, landfillable sludge 102 as they cool to ambient temperature. Upon reading the teachings of this specification, those with ordinary skill in the art will now understand that, under appropriate circumstances, considering such issues as advances in technology, user preference, the level of impurities in the used antifreeze, glycol/water ratio of the used antifreeze, etc., other total distillation times, such as eight hours, five days, ten days, etc., may suffice.

Figure 10:
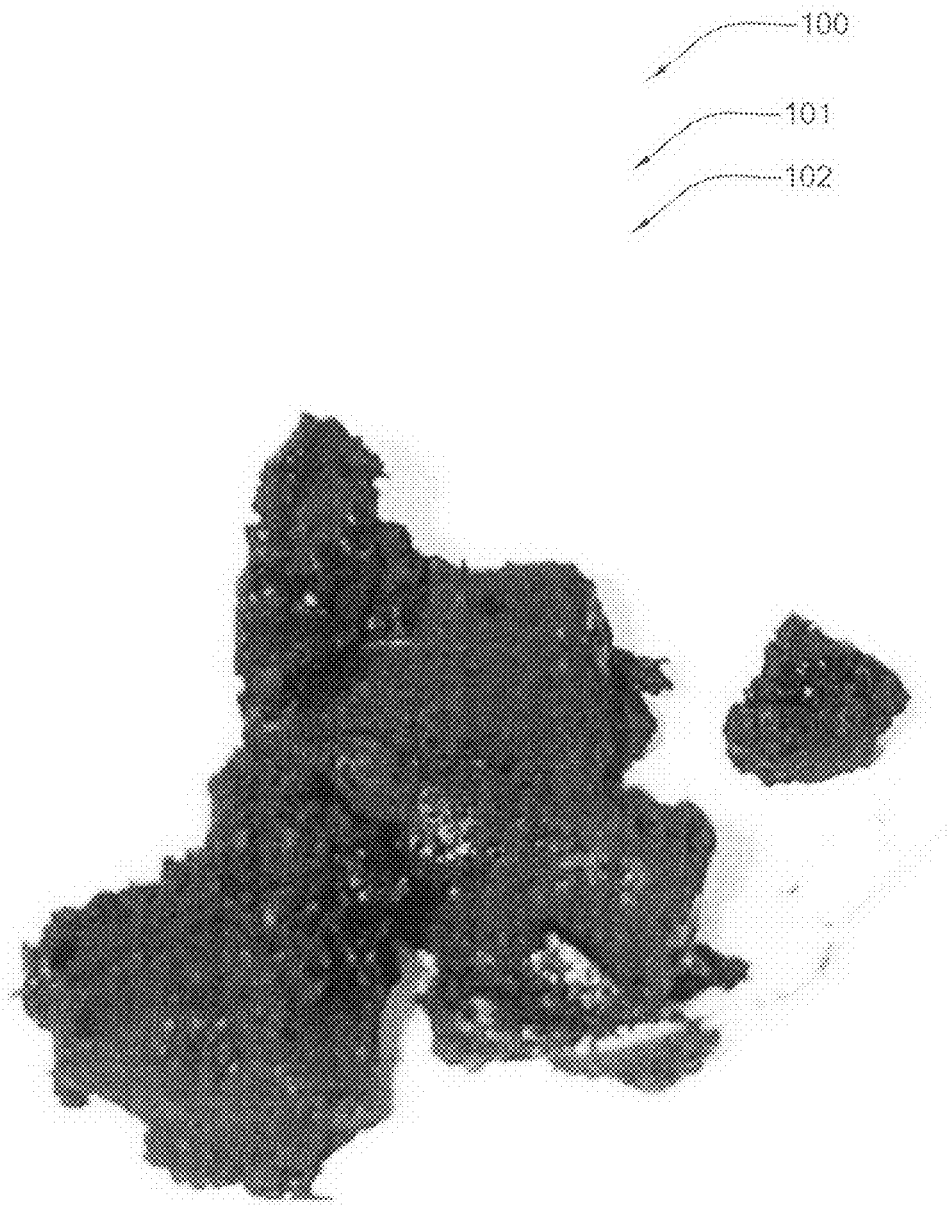
FIG. 10 shows a black and white photograph illustrating the sludge generated by the preferred embodiment of the present invention.

Preferably, when the temperature inside boiler 210 reaches about 345 degrees Fahrenheit (still at about 800 millibars pressure), controller 260 shuts off vacuum 205, shuts off heater 230, stops scraper blade 220, and then the operator opens drain port 211 at the bottom of boiler 210. Preferably, impurities 138 are dumped within about one hour of heater 230 being shut off; otherwise impurities 138 will cool enough to harden into nontoxic, landfillable sludge 102 inside boiler 120. Preferably, impurities 138 pour out of drain port 211 at about 345 degrees Fahrenheit. Nontoxic, landfillable sludge 102 preferably hardens into a thick, malleable paste as it cools to ambient temperature. Nontoxic, landfillable sludge 102 may be a foamy solid as a result of bubbles formed when some components of impurities 138 boil during dumping, as shown in FIG. 10. It is important that the temperature inside boiler 210 stays below about 350 degrees Fahrenheit (still at about 800 millibars pressure), because if the temperature inside boiler 210 reaches about 350 degrees Fahrenheit then impurities 138 will harden into a hard, solid mass within boiler 210 (the inventor has discovered that this mass is soluble in water).

Figure 3:
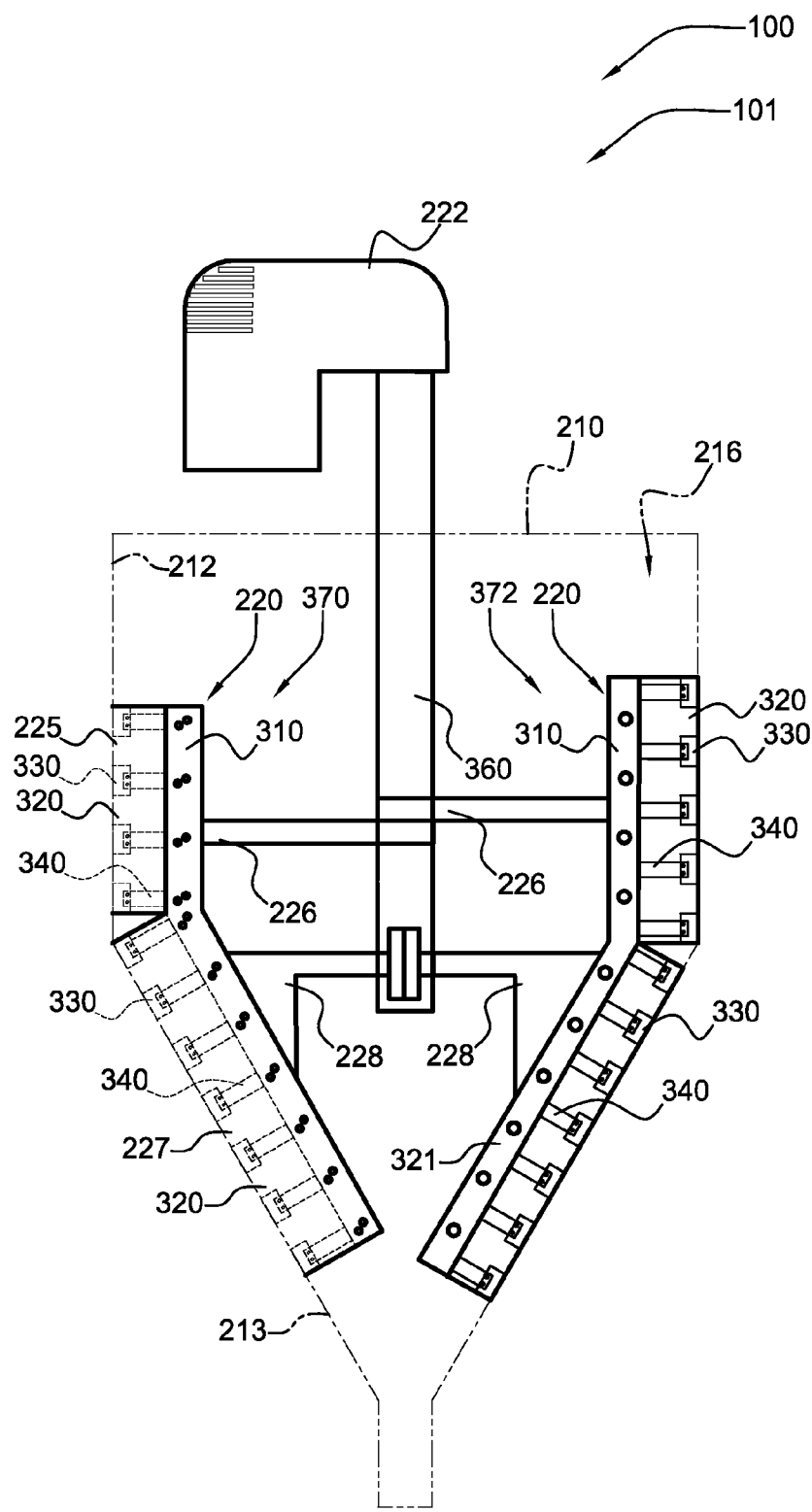
FIG. 3 shows a front view illustrating the boiler scraper according to the preferred embodiment of FIG. 2.

FIG. 3 shows a front view illustrating scraper blade 220 according to the preferred embodiment of FIG. 2. Preferably, scraper blade 220 comprises support 310, primary blade 320, and a plurality of secondary blades 330, as shown. Preferably, each secondary blade 330 is connected to primary blade 320 (and/or to support 310) by connectors 340 (at least embodying herein at least one connector structured and arranged to connect such at least one secondary blade to such at least one primary blade), as shown. Preferably, connectors 340 (at least embodying herein wherein such at least one connector comprises at least one spring structured and arranged to press such at least one secondary blade against such at least one surface) function as springs which press secondary blades 330 against inside surface 216 of boiler 210, as shown. Preferably, scraper blade 220 turns such that primary blade 320 (at least embodying herein at least one primary blade structured and arranged to scrape such at least one surface) scrapes inside surface 216 first, followed by secondary blades 330 (at least embodying herein at least one secondary blade structured and arranged to scrape such at least one surface), as shown. Preferably, secondary blades 330 are spaced less than one width of a secondary blade 330 (at least embodying herein wherein such at least one secondary blade comprises a plurality of spaced-apart secondary blades) apart from each other along the length of primary blade 320 (at least embodying herein wherein each of such exactly two primary blades comprises a plurality of spaced-apart secondary blades), as shown.

Preferably, scraper blade 220 (at least embodying herein at least one boiler scraper) is shaped to accommodate the shape of inside surface 216, as shown. Preferably, scraper blade 220 comprises upper blade 225 and lower blade 227, as shown. Preferably, upper blade 225 accommodates the shape of inside surface 216 along cylindrical sides 212, as shown. Preferably, lower blade 227 accommodates the shape of inside surface 216 along conical bottom 213, as shown. Preferably, support 310 is bent to conform to cylindrical sides 212 and conical bottom 213, as shown. Preferably, upper blade 225 and lower blade 227 are connected by connector layer 321 so that upper blade 225 and lower blade 227 rotate in unison. Preferably, support 310 comprises upper blade strut 226 and lower blade strut 228, as shown. Preferably, upper blade strut 226 connects upper blade 225 to axle 360, as shown. Preferably, lower blade strut 228 connects lower blade 227 to axle 360, as shown. Preferably, motor 222 (at least embodying herein at least one mover structured and arranged to move such at least one primary blade across such at least one surface followed by such at least one secondary blade) turns axle 360 (at least embodying herein wherein such at least one mover comprises at least one motorized axle).

Preferably, scraper blade 220 (at least embodying herein wherein such at least one primary blade comprises exactly two primary blades adapted to be rotated to scrape the inside surface of a cylinder) comprises first scraper blade 370 and second scraper blade 372, as shown, which are preferably positioned on opposite sides of axle 360, as shown. Preferably, first scraper blade 370 and second scraper blade 372 comprise different primary blade 320 lengths and/or different numbers of secondary blades 330 (at least embodying herein wherein such plurality of spaced-apart secondary blades on such exactly two primary blades overlap to provide complete scraping of the area scraped by such exactly two primary blades), as shown, so that secondary blades 330 form an overlapping pattern which completely scrapes inside surface 216 up to the fluid level maintained by level controller 262 (at least embodying herein wherein such at least one primary blade comprises exactly two primary blades adapted to be rotated to scrape the inside surface of a cylinder; and at least embodying herein wherein such at least one primary blade comprises exactly two primary blades adapted to be rotated to scrape the inside surface of a cone), as shown.

Figure 4:
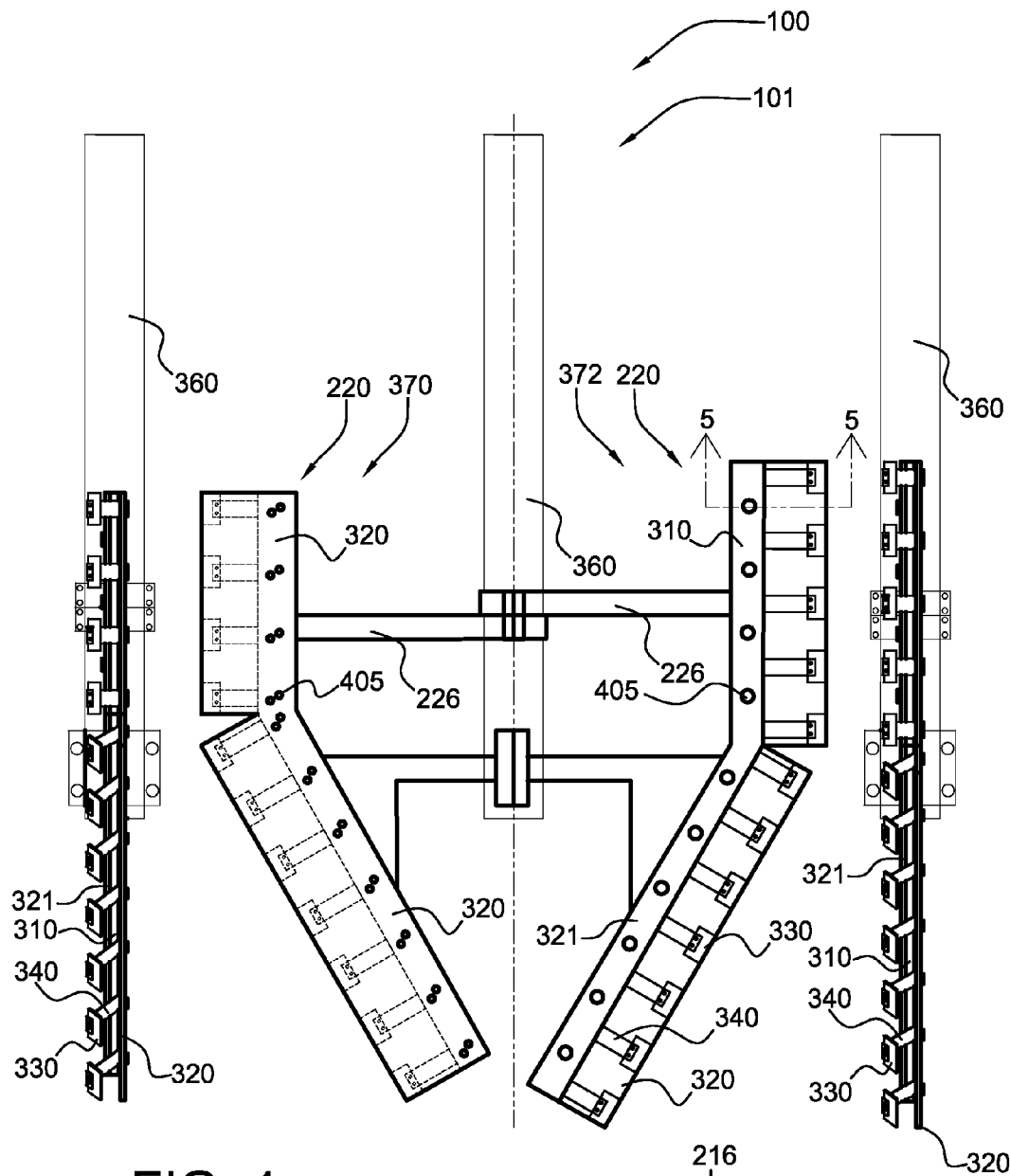
FIG. 4 shows front and side views illustrating the boiler scraper according to the preferred embodiment of FIG. 3.

FIG. 4 shows a side view illustrating scraper blade 220 according to the preferred embodiment of FIG. 2. Preferably, scraper blade 220 is assembled with welds and with bolts 405, as shown. Preferably, support 310 comprises steel, preferably stainless steel. Preferably, secondary blades 330 comprise a metal softer than boiler 210 so that boiler 210 is not significantly gouged over time. Preferably, secondary blades 330 comprise bronze. Preferably, connectors 340 comprise steel, preferably spring steel.

Figure 5:
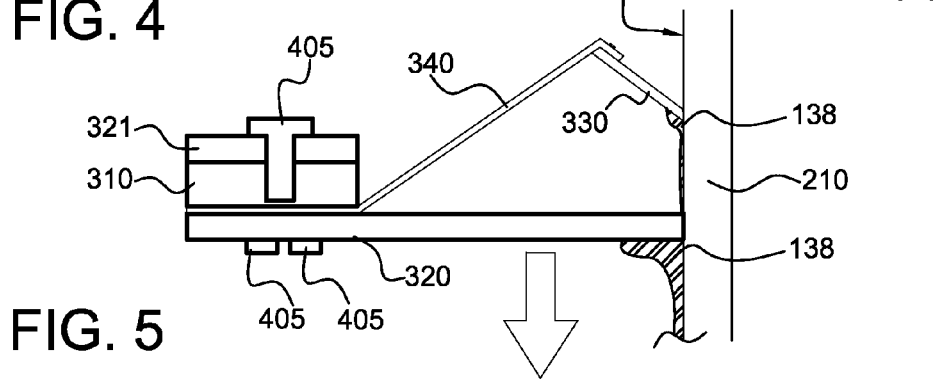
FIG. 5 shows section 5-5 of FIG. 4.

FIG. 5 shows section 5-5 illustrating scraper blade 220 according to the preferred embodiment of FIG. 2. Preferably, secondary blades 330 are angled to scrape inside surface 216 at an acute angle, as shown.

Figure 6:
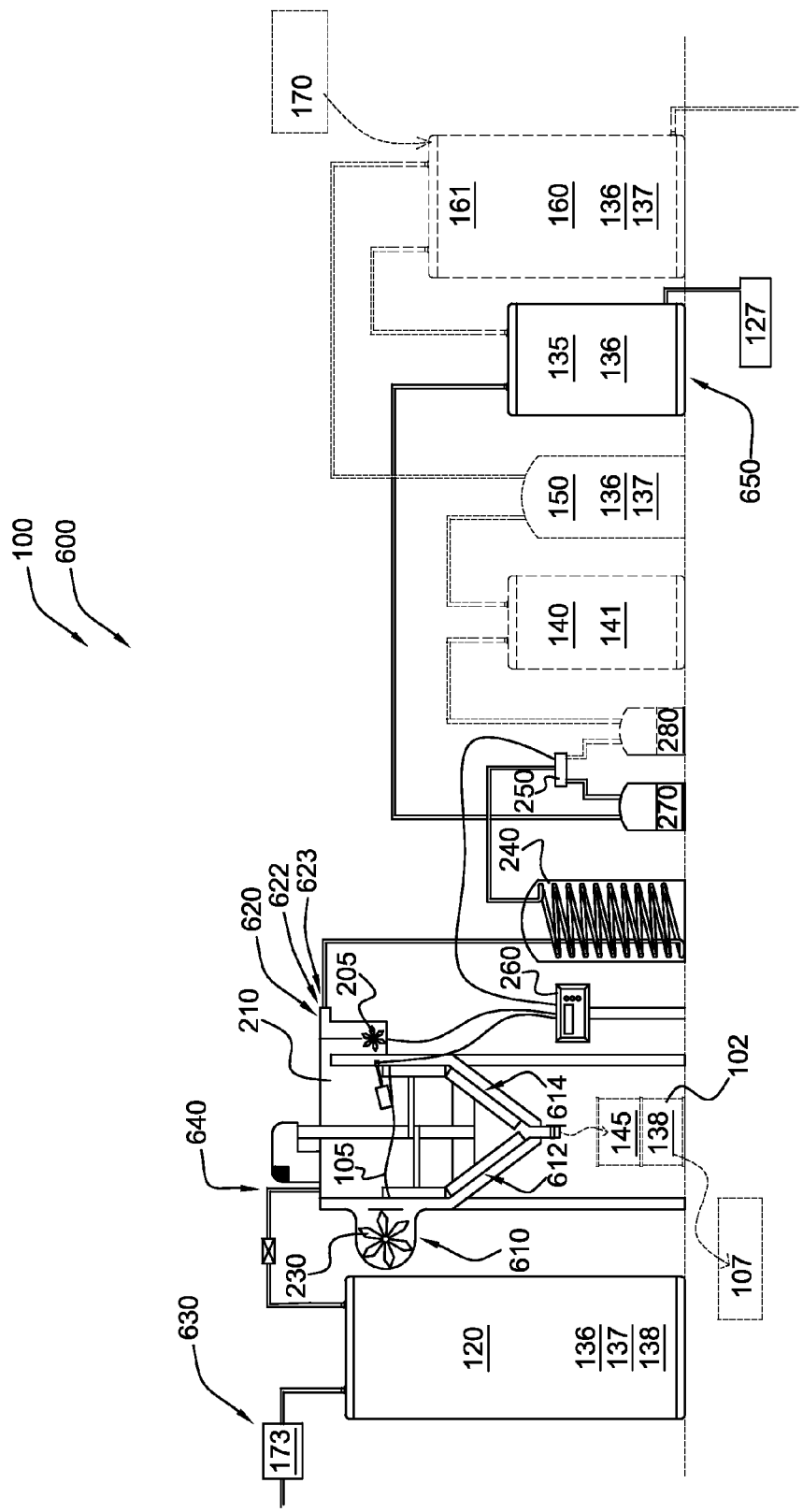
FIG. 6 shows a diagram illustrating steps in a glycol recycling method according to the preferred embodiment of the present invention, where water is being distilled from the used antifreeze.

FIG. 6 shows a diagram illustrating steps in glycol recycling method 600 according to the preferred embodiment of the present invention, where water 136 is being distilled from used antifreeze 105. Preferably, glycol recycling system 100 comprises glycol recycling method 600, as shown. Preferably, glycol recycling method 600 comprises the steps of: applying heat (step 610) to boiler 210 (at least embodying herein the step of applying heat to at least one boiler); applying vacuum (step 620) to boiler 210 (at least embodying herein the step of applying vacuum to such at least one boiler); filtering (step 630) used antifreeze 105 (at least embodying herein the step of filtering such used antifreeze prior to such step of adding used antifreeze to such at least one boiler); adding (step 640) used antifreeze 105 to boiler 210 (at least embodying herein the step of adding used antifreeze to such at least one boiler); and boiling off water 136 (step 650) from used antifreeze 105 into water tank 135 (at least embodying herein the step of boiling off water from such used antifreeze into at least one first tank), as shown.

Preferably, the step of filtering (step 630) used antifreeze 105 comprises the step of settling used antifreeze 105, as both processes provide used antifreeze 105 with reduced concentrations of large suspended particles prior to distillation.

Preferably, such step of boiling off water 136 (step 650) from used antifreeze 105 into water tank 135 is performed while distilled water 136, and not glycol 137, is evaporating from used antifreeze 105 (at least embodying herein wherein such step of boiling off water from such used antifreeze into at least one first tank is performed while distilled water, and not glycol, is evaporating from such used antifreeze), as shown.

Preferably, such step of boiling off water 136 (step 650) from used antifreeze 105 into water tank 135 is performed for about eight hours (at least embodying herein wherein such step of boiling off water from such used antifreeze into at least one first tank is performed for about eight hours), as shown.

Preferably, such step of boiling off water 136 (step 650) from used antifreeze 105 into water tank 135 is performed until used antifreeze 105 in boiler 210 (under about 800 millibars of vacuum) reaches a temperature of about two hundred thirty-five degrees Fahrenheit (at least embodying herein wherein such step of boiling off water from such used antifreeze into at least one first tank is performed until such used antifreeze in such boiler under such vacuum reaches a temperature of about two hundred thirty-five degrees Fahrenheit), as shown.

Preferably, the step of applying heat (step 610) comprises the step of intermittently scraping (step 612) inside surface 216 of boiler 210 while heat is being applied to boiler 210 (at least embodying herein the step of scraping the inside surface of such at least one boiler while heat is being applied to such at least one boiler), as shown. Preferably, scraper blade 220 is used for about two minutes at about ten minute intervals throughout the distillation process. Upon reading the teachings of this specification, those with ordinary skill in the art will now understand that, under appropriate circumstances, considering such issues as advances in technology, user preference, equipment setup, etc., other intervals, such as one minute out of two, one minute out of five, etc., may suffice.

Preferably, the step of scraping (step 612) inside surface 216 of boiler 210 while heat is being applied to boiler 210 comprises the step of continuously scraping (step 614) inside surface 216 of boiler 210 while heat is being applied to boiler 210 (at least embodying herein the step of continuously scraping the inside surface of such at least one boiler while heat is being applied to such at least one boiler), as shown.

Preferably, such step of applying vacuum (step 620) to boiler 210 comprises the step of applying (step 622) between about six hundred millibars and about eight hundred millibars of vacuum to boiler 210 (at least embodying herein wherein such step of applying vacuum to such at least one boiler comprises the step of applying between about six hundred millibars and about eight hundred millibars of vacuum to such at least one boiler), as shown.

Preferably, such step of applying vacuum (step 620) to boiler 210 comprises the step of applying (step 623) about eight hundred millibars of vacuum to boiler 210 (at least embodying herein wherein such step of applying vacuum to such at least one boiler comprises the step of applying about eight hundred millibars of vacuum to such at least one boiler), as shown.

Figure 7:
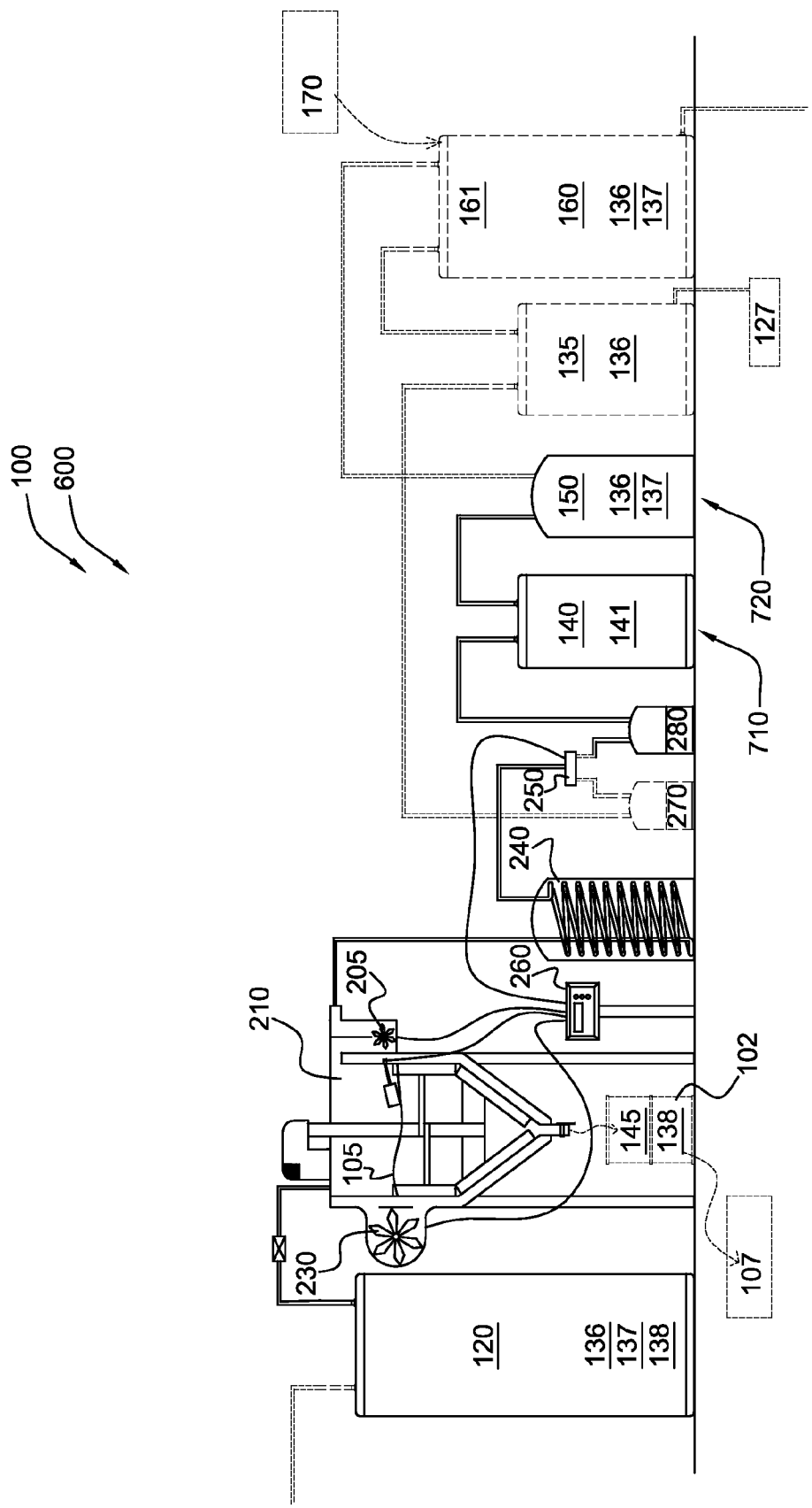
FIG. 7 shows a diagram illustrating additional steps in a glycol recycling method according to the preferred embodiment of the present invention, where water and glycol are being distilled from the used antifreeze.

FIG. 7 shows a diagram illustrating additional steps in glycol recycling method 600 according to the preferred embodiment of the present invention, where water 136 and glycol 137 are being distilled from used antifreeze 105. Preferably, glycol recycling method 600 comprises the steps of: boiling (step 710) off water 136 and glycol 137 (recovered antifreeze 141) from used antifreeze 105 into recovered antifreeze tank 140 (at least embodying herein the step of boiling off water and glycol from such used antifreeze into at least one second tank); and carbon-filtering (step 720) water 136 and glycol 137 from recovered antifreeze tank 140 (at least embodying herein the step of carbon-filtering such water and glycol from such second tank), as shown.

Preferably, such step of adding (step 640) used antifreeze 105 to boiler 210 occurs during such step of boiling off water 136 (step 650) from used antifreeze 105 into water tank 135 and during such step of boiling off water 136 and glycol 137 from used antifreeze 105 into recovered antifreeze tank 140 (at least embodying herein wherein such step of adding used antifreeze to such at least one boiler occurs during such step of boiling off water from such used antifreeze into at least one first tank and during such step of boiling off water and glycol from such used antifreeze into at least one second tank), as shown.

Preferably, such step of boiling (step 710) off water 136 and glycol 137 from used antifreeze 105 into recovered antifreeze tank 140 is performed while water 136 and glycol 137 are both evaporating from used antifreeze 105 (at least embodying herein wherein such step of boiling off water and glycol from such used antifreeze into at least one second tank is performed while water and glycol are both evaporating from such used antifreeze), as shown.

Preferably, such step of boiling (step 710) off water 136 and glycol 137 from used antifreeze 105 into recovered antifreeze tank 140 is performed for about sixty hours (at least embodying herein wherein such step of boiling off water and glycol from such used antifreeze into at least one second tank is performed for about sixty hours), as shown.

Preferably, such step of boiling (step 710) off water 136 and glycol 137 from used antifreeze 105 into recovered antifreeze tank 140 is performed after used antifreeze 105 in boiler 210 (under about 800 millibars vacuum) reaches a temperature of about two hundred thirty-five degrees Fahrenheit (at least embodying herein wherein such step of boiling off water and glycol from such used antifreeze into at least one second tank is performed after such used antifreeze in such boiler under such vacuum reaches a temperature of about two hundred thirty-five degrees Fahrenheit), as shown.

Preferably, such step of boiling (step 710) off water 136 and glycol 137 from used antifreeze 105 into recovered antifreeze tank 140 is performed until used antifreeze 105 in boiler 210 (under about 800 millibars vacuum) reaches a temperature of about two hundred fifty-five degrees Fahrenheit (at least embodying herein wherein such step of boiling off water and glycol from such used antifreeze into at least one second tank is performed until such used antifreeze in such boiler under such vacuum reaches a temperature of about two hundred fifty-five degrees Fahrenheit), as shown.

Figure 8:
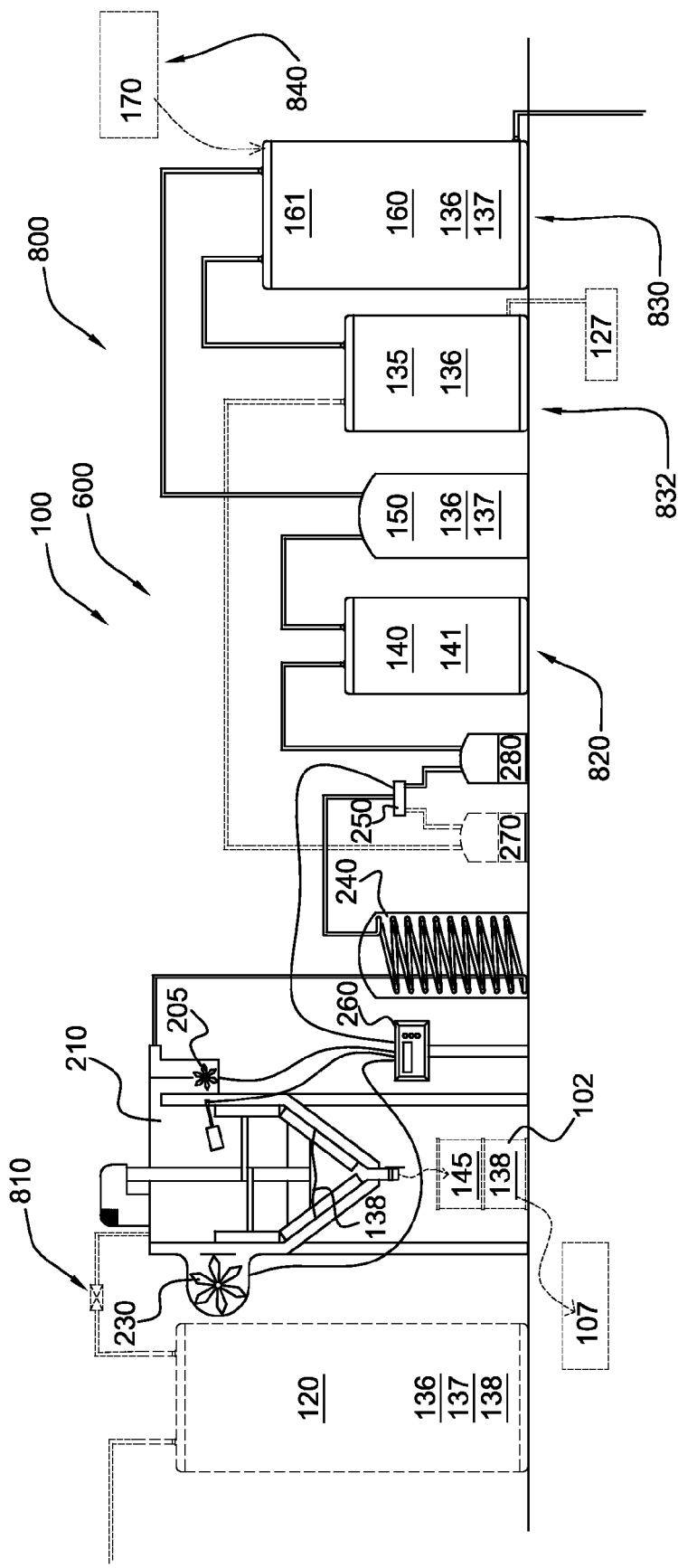
FIG. 8 shows a diagram illustrating more steps in a glycol recycling method according to the preferred embodiment of the present invention, where water and glycol are being distilled from the used antifreeze to reduce the volume of the sludge.

FIG. 8 shows a diagram illustrating more steps in glycol recycling method 600 according to the preferred embodiment of the present invention, where water 136 and glycol 137 are being distilled from the used antifreeze 105 to reduce the volume of water 136 and glycol 137 in impurities 138. Preferably, glycol recycling method 600 comprises the steps of: shutting off (step 810) the supply of used antifreeze 105 into boiler 210 (at least embodying herein the step of shutting off the supply of used antifreeze into such boiler); boiling (step 820) off additional water 136 and glycol 137 from used antifreeze 105 into recovered antifreeze tank 140, while simultaneously scraping inside surface 216 of boiler 120, until such impurities 138 are concentrated into thick liquid (at least embodying herein the step of boiling off additional water and glycol from such used antifreeze into such at least one second tank until such impurities are concentrated into thick liquid) in boiler 210, as shown.

Preferably, glycol recycling method 600 further comprises the step of reducing the amount of glycol 137 lost in process to less than about one percent of the volume of used antifreeze 105 (at least embodying herein the step of reducing the amount of glycol lost in-process to less than about one percent of the volume of such used antifreeze).

Preferably, glycol recycling method 600 further comprises the step of converting (step 830) water 136 and glycol 137 from recovered antifreeze tank 140 into sellable antifreeze (new antifreeze 180) (at least embodying herein the step of converting such water and glycol from such at least one second tank into sellable antifreeze), preferably in makeup tank 160, as shown.

Typically, the steps of boiling (step 650) off water 136 from used antifreeze 105 into water tank 135, boiling (step 710) off water 136 and glycol 137 from used antifreeze 105 into recovered antifreeze tank 140 (for about sixty hours), and boiling (step 820) off additional water 136 and glycol 137 from used antifreeze 105 into recovered antifreeze tank 140 until such impurities 138 are concentrated into thick liquid in boiler 210 (in a process that takes about three days, a "long batch") result in about a 40/60 mixture of glycol/water in a recovered antifreeze tank 140.

Typically, the steps of boiling (step 650) off water 136 from used antifreeze 105 into water tank 135, boiling (step 710) off water 136 and glycol 137 from used antifreeze 105 into recovered antifreeze tank 140 (for about ten hours), and boiling (step 820) off additional water 136 and glycol 137 from used antifreeze 105 into recovered antifreeze tank 140 until such impurities 138 are concentrated into thick liquid in boiler 210 (in a process that takes about one day, a "day batch") result in about a 60/40 mixture of glycol/water in a recovered antifreeze tank 140.

Typically, the steps of boiling (step 650) off water 136 from used antifreeze 105 into water tank 135, and then immediately boiling (step 820) off additional water 136 and glycol 137 from used antifreeze 105 into recovered antifreeze tank 140 until such impurities 138 are concentrated into thick liquid in boiler 210 (in a process that takes about one day, a "short batch") result in about a 70/30 mixture of glycol 137 and water 136 in a recovered antifreeze tank 140.

Preferably, recovered antifreeze tank 140 comprises a plurality of recovered antifreeze tanks 140, so that long batches, day batches, and/or short batches can be stored separately from each other.

In order to achieve about a 50/50 mix of glycol 137 and water 136, it is necessary to combine long batches, day batches, and/or short batches in makeup tank 160. Preferably, long batches, day batches, and/or short batches are mixed to achieve about 50/50 glycol 137 and water 136 without adding water 136 from water tank 135. Preferably, for non-automotive customers, long batches, day batches, and/or short batches are mixed to achieve about 40/60 glycol 137 and water 136.

Preferably, glycol recycling method 600 further comprises the step of adding (step 832) additional water 136 from water tank 135 to water 136 and glycol 137 in recovered antifreeze tank 140 to generate glycol mix 161 comprising about fifty volume percent water 136 and about fifty volume percent glycol 137 (at least embodying herein the step of adding water to such water and glycol from such at least one second tank to generate a mixture comprising about fifty volume percent water and about fifty volume percent glycol), as shown.

Preferably, glycol recycling method 600 further comprises the step of adding (step 840) addpack 170 to glycol mix 161 to generate new antifreeze 180 (at least embodying herein the step of adding at least one anti-corrosion additive to such mixture), preferably in recovered antifreeze tank 140, as shown.

Preferably, such step of boiling (step 820) off additional water 136 and glycol 137 from used antifreeze 105 into recovered antifreeze tank 140 until such impurities 138 are concentrated into thick liquid is performed in boiler 210 under about 800 millibars vacuum between about three hundred twenty-five degrees Fahrenheit and about three hundred forty-five degrees Fahrenheit (at least embodying herein wherein such step of boiling off additional water and glycol from such used antifreeze into such at least one second tank until such impurities are concentrated into thick liquid is performed in such boiler under such vacuum between about three hundred twenty-five degrees Fahrenheit and about three hundred forty-five degrees Fahrenheit).

Preferably, glycol recycling system 100 comprises glycol recycling method 800, as shown. Preferably, glycol recycling method 800 comprises the steps of: distilling such used antifreeze 105, in at least one simple-distillation apparatus (preferably distillery 110) comprising at least one boiler 210, until substantially all glycol 137 is distilled from such impurities 138; scraping the inside surface of such at least one boiler 210 (preferably with scraper blade 220) during such distillation; and allowing such impurities 138 to cool to ambient temperature, whereby at least one nontoxic, landfillable sludge 102 is formed (at least embodying herein the steps of: distilling such used antifreeze, in at least one simple-distillation apparatus comprising at least one boiler, until substantially all glycol is distilled from such impurities; scraping the inside surface of such at least one boiler during such distillation; and allowing such impurities to cool to ambient temperature, whereby at least one nontoxic, landfillable sludge is formed).

Preferably, glycol recycling method 800 further comprises the step of collecting at least one first distillate comprising less than about 45 percent glycol 137 and comprising more than about 55 percent water 136.

Preferably, glycol recycling method 800 further comprises the step of collecting at least one second distillate comprising less than about 45 percent water 136 and comprising more than about 55 percent glycol 137.

Preferably, glycol recycling method 800 further comprises the steps of: collecting at least one first distillate comprising less than about 45 percent glycol 137 and comprising more than about 55 percent water 136; collecting at least one second distillate comprising less than about 45 percent water 136 and comprising more than about 55 percent glycol 137; and mixing said at least one first distillate and said at least one second distillate to generate at least one third distillate.

Preferably, said at least one third distillate comprises about 50 percent water 136 and comprises about 50 percent glycol 137. This mixture is preferred for automotive use. Preferably, said at least one third distillate comprises less than about 60 percent water 136 and comprises more than about 40 percent glycol 137. This mixture is preferred for some industrial applications. Upon reading the teachings of this specification, those with ordinary skill in the art will now understand that, under appropriate circumstances, considering such issues as advances in technology, user preference, intended use, etc., other finished mixtures, such as 70/30 glycol/water, 40/60 glycol/water, etc., may suffice.

Figure 9:
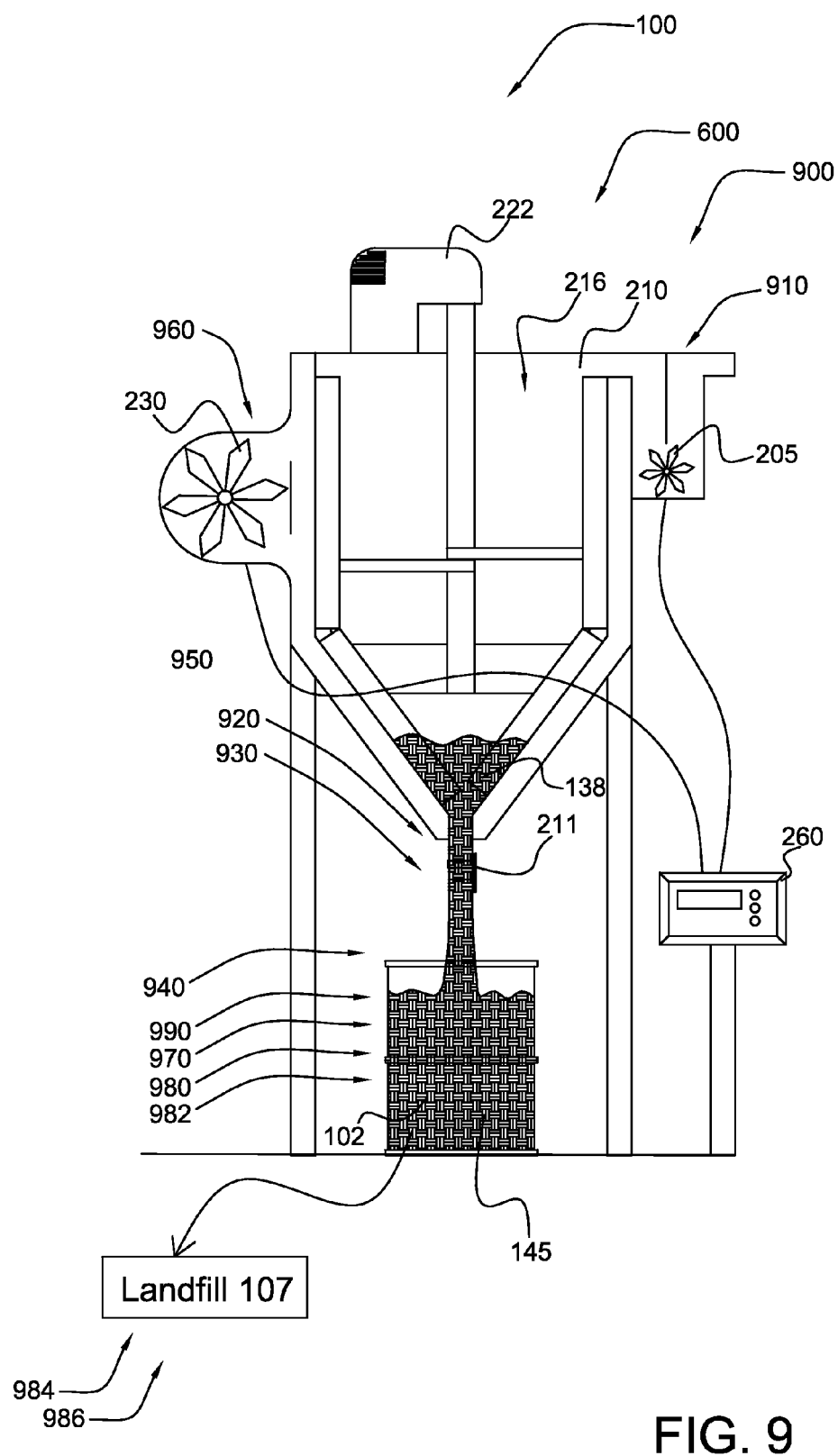
FIG. 9 shows a diagram illustrating still more steps in a glycol recycling method according to the preferred embodiment of the present invention, where the residual sludge is hot-dumped to generate nontoxic, landfillable waste.

FIG. 9 shows a diagram illustrating still more steps in glycol recycling method 600 according to the preferred embodiment of the present invention, where impurities 138 are hot-dumped to generate nontoxic, landfillable sludge 102. Preferably, glycol recycling method 600 comprises the steps of: releasing (step 910) vacuum from boiler 210 (at least embodying herein the step of releasing such at least one vacuum from such at least one boiler); opening (step 920) drain port 211 at the bottom of boiler 210 (at least embodying herein the step of opening at least one port at the bottom of such at least one boiler); dumping (step 930) impurities 138 from boiler 210 (at least embodying herein the step of dumping such impurities from such at least one boiler); and allowing (step 970) impurities 138 to cool to ambient temperature, whereby at least one nontoxic, landfillable sludge 102 is formed (at least embodying herein the step of allowing such impurities to cool to ambient temperature, whereby at least one nontoxic, landfillable sludge is formed), as shown.

Preferably, glycol recycling method 600 further comprises the step of shutting off (step 960) the supply of heat to boiler 210 before the step of dumping (step 930) impurities 138 from boiler 210 (at least embodying herein the step of shutting off such supply of heat to such at least one boiler before such step of dumping such impurities from such at least one boiler), as shown.

Preferably, glycol recycling method 600 further comprises the step of certifying (step 980) nontoxic, landfillable sludge 102 as nontoxic waste (at least embodying herein the step of certifying such at least one nontoxic, landfillable sludge as nontoxic waste), as shown. Landfillable sludge 102, produced by applicant's within-described process, has been certified nontoxic by appropriate testing, as described herein. Results of such testing are reported in Table 5.

Preferably, glycol recycling method 600 further comprises the step of certifying (step 982) nontoxic, landfillable sludge 102 as landfillable waste (at least embodying herein the step of certifying such at least one nontoxic, landfillable sludge as landfillable waste), as shown.

Preferably, glycol recycling method 600 further comprises the step of disposing (step 984) of nontoxic, landfillable sludge 102 in landfill (at least embodying herein the step of disposing of such at least one nontoxic, landfillable sludge in at least one landfill), as shown.

Preferably, glycol recycling method 600 further comprises the step of disposing (step 986) of nontoxic, landfillable sludge 102 in public landfill 107 (at least embodying herein the step of disposing of such at least one nontoxic, landfillable sludge in at least one public landfill), as shown.

Preferably, glycol recycling method 600 further comprises the step of generating (step 990) a volume of nontoxic, landfillable sludge 102 that is less than about four percent of the starting volume of used antifreeze 105 (at least embodying herein the step of generating a volume of such at least one nontoxic, landfillable sludge that is less than four percent of the volume of such used antifreeze), as shown.

Preferably, such step of dumping (step 930) impurities 138 from boiler 210 occurs while impurities 138 are about three hundred forty-five degrees Fahrenheit (at least embodying herein wherein such step of dumping such impurities from such at least one boiler occurs while such impurities are about three hundred forty-five degrees Fahrenheit).

Preferably, such step of adding (step 640) used antifreeze 105 to boiler 210 and such step of dumping (step 930) impurities 138 from boiler 210 occur about three days apart (at least embodying herein wherein such step of adding used antifreeze to such at least one boiler and such step of dumping such at least one nontoxic, landfillable sludge from such at least one boiler occur about three days apart).

Preferably, glycol recycling system 100 comprises glycol recycling method 900, as shown. Preferably, glycol recycling method 900 comprises the steps of: distilling such used antifreeze 105, at about 800 millibars pressure, to about three hundred forty-five degrees Fahrenheit, in at least one simple-distillation apparatus (preferably distillery 110) comprising at least one boiler 210; scraping the inside surface of such at least one boiler 210 during such distillation; and allowing such impurities 138 to cool to ambient temperature, whereby at least one nontoxic, landfillable sludge 102 is formed (at least embodying herein the steps of: distilling such used antifreeze, at about 800 millibars pressure, to about three hundred forty-five degrees Fahrenheit, in at least one simple-distillation apparatus comprising at least one boiler; scraping the inside surface of such at least one boiler during such distillation; and allowing such impurities to cool to ambient temperature, whereby at least one nontoxic, landfillable sludge is formed). Upon reading the teachings of this specification, those with ordinary skill in the art will now understand that, under appropriate circumstances, considering such issues as advances in technology, user preference, type of equipment used, etc., other pressure and temperature combinations sufficient to distill the used antifreeze without causing undue polymerization of the glycol may suffice.

FIG. 10 shows a black and white photo illustrating nontoxic, landfillable sludge 102 according to the preferred embodiment of the present invention. Preferably, nontoxic, landfillable sludge 102 is a soft, porous solid, as shown. Preferably, nontoxic, landfillable sludge 102 primarily comprises the anticorrosive additives and the dyes that were in used antifreeze 105, with other impurities.

A sample of new antifreeze 180 was tested to determine whether such sample was compliant with the below reported ASTM, TMC, and Military CID standards. The testing was performed by an ASTM/ISO 17025 accredited laboratory certified to perform ASTM testing. An analytical identification of a sample (such sample hereinafter referred to as Sample A) was performed and is reported below in Table 1. Further testing on Sample A is reported below. With respect to color in Table 1, the ASTM preferred color is green, but fluids of this type are often colored fuchsia in compliance with the TMC RP 338 specification.

TABLE 1

Analytical Identification of Sample A

| Physical Data | Color and Appearance | Color is not a performance parameter |
|---|---|---|
| | pH (ASTM D1287) | 10.53 |
| | % Antifreeze from chart | 50 |
| | Freezing Point by ASTM D3321 | −34 |
| Corrosion Inhibitors | Boron (ASTM D6130) | 193 mg/l |
| | Molybdenum (ASTM D6130) | 0 mg/l |
| | Nitrites (ASTM D5827) | 1255 mg/l |
| | Nitrates (ASTM D5827) | 424 mg/l |
| | Phosphate (ASTM D5827) | 33 mg/l |
| | Silicon (ASTM D6130) | 148 mg/l |
| Age and Wear Indicators | Al (ASTM D6130) | 0 mg/l |
| | Ca (ASTM D6130) | 0 mg/l |
| | Cl (ASTM D5827) | 4 mg/l |
| | Cu (ASTM D6130) | 0 mg/l |
| | Formate (glycol degradation acid) | 0 mg/l |
| | Glycolate (glycol degradation acid) | 0 mg/l |
| | Fe (ASTM D6130) | 0 mg/l |
| | Mg (ASTM D6130) | 0 mg/l |
| | Pb (ASTM D6130) | 0 mg/l |
| | Sulfate (ASTM D5827) | 0 mg/ll |
| Azoles and Carboxylates by HPLC | Mercaptobenzothiazole | 328 mg/l |
| | Benzotriazole | 0 mg/l |
| | Tolyltriazole | 288 mg/l |
| | Benzoate | 0 mg/l |
| | 2 Ethylhexanoic acid | 0 mg/l |
| | Sebacic acid | 0 mg/l |

Testing was performed to determine whether Sample A met the standards of ASTM D6471-03 (Standard Specification for Recycled Prediluted Aqueous Glycol Base Engine Coolant (50 Volume % Minimum) for Automobile and Light-Duty Service) and ASTM D6210-03 (Type 3) (Standard Specification for Fully-Formulated Glycol Base Engine Coolant for Heavy-Duty Engines), both ASTM specifications of which are hereby incorporated by reference in their entirety. As shown below in Table 2, the reported results confirm that Sample A meets the requirements of ASTM D6471 and ASTM D6210. It is anticipated that new antifreeze 180 will continue to meet the current requirements for use in automobile and light-duty vehicles as well as for use in the cooling systems of heavy-duty engines.

TABLE 2

ASTM Physical and Chemical Tests for Sample A

| Test Number & Description | Test Result |
|---|---|
| D1122 Specific Gravity | 1.0741 |
| D1177 Freeze Point | −38.5° C. |
| (As received) | (−37.4° F.) |
| D1120 Boiling Point | 108.0° C. |
| (As received) | (226.4° F.) |
| D1882 Auto Finish Effect | None |
| D1119 Ash Content | 0.46% |
| D1287 pH: As received | 10.53 |
| D3634 Chloride | 4 |
| D1121 Reserve Alkalinity (ml) | 3.6 |
| D1881 Foaming Tendencies | Break 1.8 Sec Vol. 70 ml |

Further testing was performed to determine whether or not Sample A would contribute to cavitation corrosion, erosion-corrosion, etc., of coolant systems. Accordingly, testing was done pursuant to ASTM D2809 (Cavitation Corrosion and Erosion-Corrosion Characteristics of Aluminum Pumps With Engine Coolants), ASTM D4340 (Corrosion of Cast Aluminum Alloys in Engine Coolants Under Heat-Rejecting Conditions), ASTM D1384 (Corrosion Test for Engine Coolants in Glassware), ASTM D2570 (Simulated Service Corrosion Testing of Engine Coolants), and ASTM D6208 (Repassivation Potential of Aluminum and Its Alloys by Galvanostatic Measurement), all such ASTM specifications of which are hereby incorporated by reference in their entirety.

The ASTM D2809 test method consists of pumping a sample aqueous coolant solution at 113° C. (235° F.) through a pressurized 103-kPa (15-psig) simulated automotive coolant system. An aluminum automotive water pump, driven at 4600 r/min by an electric motor, is used to pump the solution and to serve as the object specimen in evaluating the cavitation erosion-corrosion effect of the coolant under test. The pump is examined to determine the extent of cavitation erosion-corrosion damage and is rated according to the system specified in ASTM D2809. Sample A passed the ASTM D2809 test method with a pump rating of 8 as shown below in Table 3.

The ASTM D4340 test method covers a laboratory screening procedure for evaluating the effectiveness of engine coolants in combating corrosion of aluminum casting alloys under heat-transfer conditions that may be present in aluminum cylinder head engines. A heat flux is established through a cast aluminum alloy typical of that used for engine cylinder heads while exposed to the sample engine coolant under a pressure of 193 kPa (28 psi). The temperature of the aluminum specimen is maintained at 135° C. (275° F.) and the test is continued for 1 week (168 h). The effectiveness of the coolant for preventing corrosion of the aluminum under heat-transfer conditions (hereafter referred to as heat-transfer corrosion) is evaluated on the basis of the weight change of the test specimen. As reported in Table 3, Sample A experienced no average-value change in specimen weight. The average reported pH of the tested Sample A solution after completion of the D4340 test was 8.23.

The ASTM D1384 test method covers a simple beaker-type procedure for evaluating the effects of engine coolants on metal specimens under controlled laboratory conditions. Specimens of metals typical of those present in engine cooling systems are totally immersed in aerated sample engine coolant solutions prepared with corrosive salts for 336 hours at 88° C. (190° F.). The corrosion inhibition properties of the test solution are evaluated on the basis of the weight changes incurred by the specimens. Each test is run in triplicate, and the average weight change is determined for each metal. This test method will generally distinguish between coolants that are definitely deleterious from the corrosion standpoint and those that are suitable for further evaluation. The following metal test specimens, 1 by 2 inches in size, representative of cooling system metals, were used:

1. Steel, UNS G10200 (SAE 1020), Chemical composition of the carbon steel is as follows: carbon, 0.17 to 0.23%; manganese, 0.30 to 0.60%; phosphorus, 0.040% maximum; sulfur, 0.050% maximum;
2. Copper, conforming to UNS C11000 (SAE CA110) or UNS C11300 (SAE CA113). Cold-rolled;
3. Brass, conforming to Alloy UNS C26000 (SAE CA 260);
4. Solder, a brass specimen as described in 6.1.3, coated with solder conforming to Alloy Grade 30A (SAE 3A);
5. Cast Aluminum, conforming to Alloy UNS A23190 (SAE 329); and
6. Cast Iron, conforming to Alloy UNS F10007 (SAE G3500).

The average values of the ASTM D1384 test are reported below in Table 3. As shown, Sample A met the requirements of ASTM D1384.

The ASTM D2570 test method was performed to evaluate the effect of the sample circulating engine coolant on metal test specimens and automotive cooling system components under controlled, essentially isothermal laboratory conditions. This test method specifies test material, cooling system components, type of coolant, and coolant flow conditions that are considered typical of current automotive use. An engine coolant is circulated for 1064 h (used herein to refer to "hours") at 190° F. (88° C.) in a flow loop consisting of a metal reservoir, an automotive coolant pump, an automotive radiator, and connecting rubber hoses. Test specimens representative of engine cooling system metals are mounted inside the reservoir, which simulates an engine cylinder block. At the end of the test period, the corrosion-inhibiting properties of the coolant are determined by measuring the mass losses of the test specimens and by visual examination of the interior surfaces of the components. This test method, by a closer approach to engine cooling system conditions, provides better evaluation and selective screening of engine coolants than is possible from glassware testing (ASTM Test Method D1384). The improvement is achieved by controlled circulation of the coolant, by the use of automotive cooling system components, and by a greater ratio of metal surface area to coolant volume. The same metal test specimens used in ASTM D1384 are also used in ASTM 2570.

As reported in Table 3, Sample A met the requirements of ASTM D3306 (Standard Specification for Glycol Base Engine Coolant for Automobile and Light-Duty Service).

The ASTM D6208 test was also performed. The ASTM D6208 test is a procedure to determine the repassivation potential of aluminum alloy 3003-H14 (UNS A93003) as a measure of relative susceptibility to pitting corrosion by conducting a galvanostatic polarization. This test method is designed to measure the relative effectiveness of inhibitors to mitigate pitting corrosion of aluminum and its alloys, in particular AA3003-H14, rapidly and reproducibly. Qualitative correlation of the measurements and susceptibility in service has been established. The maximum potential reached upon initial polarization, $E_B$, is a measure of the resistance to breakdown of the aluminum oxide film. Lower susceptibility to initiation of pitting corrosion is indicated by a more noble potential. This potential, as measured in this test method, is not very sensitive to the inhibitors present. The minimum potential, $E_G$ (following the maximum potential), is a measure of the protection against continued pitting corrosion by the inhibitors. Again, a more noble potential indicates better protection. This potential is sensitive to the inhibitors present. Visual examination of the specimens can provide information about subtleties of the pitting and inhibition mechanisms. The test result is herein reported as minimum readings. The test was run in triplicate with results as follows: 1. 56.0 mV, 2. 52.0 mV, and 3. 33.0 mV. The average test result minimum reading is reported below in Table 3. The accepted passing value is greater than −400 mV.

The Scaling Resistance of the sample engine coolant on hot steel surfaces was also performed as published in "Scale and Deposits in High Heat Rejecting Engines", *Engine Coolant Testing*, Fourth Volume, STP 1335, ASTM International, 100 Barr Harbor Drive, West Conshohoshocken, Pa. 19428. This test method circulates coolant at 190° F. past a stainless steel heater rod that is heated to 400° F. for 96 hours. The test fluid may be engineered to contain hard water minerals or other hot-surface-depositing species. At the conclusion of the 96-hour exposure, the heater rod is removed and dried. The weight of deposit is determined by comparing the weight of the prepared rod before and after exposure. The results of the Scaling Test are reported below in Table 3. At the time of this application, no industry standard exists for pass/fail in hot surface scale testing.

TABLE 3

Results of Corrosion Testing for Sample A

| Test | Test Result | |
|---|---|---|
| ASTM D2809 Water Pump Cavitation-Erosion | 8 | |
| pH Before & After Test | 9.64 & 8.71 | |
| Comments | Light corrosion or erosion generalized on working surfaces. Dimensional change not exceeding 0.4 mm (164 in.). | |
| ASTM D4340 Corrosion of Aluminum Heat Rejecting Surface (Average Value) | 0.00 mg/cm2/week | |
| pH After Test (Average Value) | 8.23 | |
| ASTM D1384 Corrosion in Glassware (Average Values) | Cu | 2 mg |
| | Solder | 4 mg |
| | Brass | 1 mg |
| | Steel | 1 mg |
| | Cast Fe | 1 mg |
| | Cast Al | −2 mg |
| D2750 Simulated Service (Average Values) | Cu | 2 mg |
| | Solder | 9 mg |
| | Brass | 3 mg |
| | Steel | 1 mg |
| | Cast Fe | −1 mg |
| | Cast Al | 0 mg |
| pH Before & After Test | 10.08 & 8.28 | |
| RA Before & After Test | 3.2 & 2.6 | |
| Comments | All exposed parts were in very good condition following the testing | |
| ASTM D6208 (Average Value) | 47 mV | |

TABLE 3-continued

Results of Corrosion Testing for Sample A

| Test | Test Result |
| --- | --- |
| Hot Surface Scale Resistance | |
| Weight Before & After Exposure | 298.851 g & 299.607 g |
| Net Weight Change | 0.756 g |

Sample A was also tested per Military Commercial Item Description (CID) ID A-A-52624 for multi-engine-type antifreeze (which is hereby incorporated by reference in its entirety). The results of the Compatibility Test (3.2.3.1) and Storage Stability Test (3.2.4.1) described in Military CID A-A-52624 are reported below in Table 4.

For the Compatibility Test, a sample of Sample A and of a reference fluid were obtained. A 60% volume solution of each sample with corrosive water conforming to ASTM D1384 was prepared. Each sample was placed in a suitable glass-stoppered 100 mL graduated cylinders. The solution in the graduated cylinder was mixed and then allowed to stand in a lit area, undisturbed at room temperature, for 24 hours. After 24 hours, the solution was observed for any precipitate, phase separation, turbidity, or cloudiness. The observation of excessive precipitates or large phase separations constitutes failure of this test. Slight turbidity, cloudiness, and minor amounts of precipitates and/or small phase separations due to antifoam agents of less than 0.5% of the total volume of solution are permissible.

For the Storage Stability Test, 100 mL of Sample A was placed in a suitable glass-stoppered, 100 mL graduated cylinder. The solution was allowed to stand in a lit area, at room temperature, undisturbed for 24 hours. After 24 hours, the solution was observed for any precipitate, phase separation, turbidity, or cloudiness. For an additional 24 hours, the stoppered solution was placed in an oven at 140° F. (60° C.). After 24 hours, the solution was removed from the oven and again observed for any precipitate, phase separation, turbidity, or cloudiness. The observation of excessive precipitates or large phase separations constitutes failure of this test. Slight turbidity, cloudiness, small amounts of precipitates, and/or small phase separations, due to antifoam agents of less 0.5% of the total volume of solution, are permissible.

TABLE 4

Storage and Stability Testing of Sample A

| | Test | Result |
| --- | --- | --- |
| Compatibility Test 3.2.3.1 | Precipitation (24 hrs) | None |
| | Phase Separation (24 hrs) | None |
| | Turbidity (24 hrs) | None |
| | Cloudiness (24 hrs) | None |
| | Precipitation (48 hrs) | None |
| | Phase Separation (48 hrs) | None |
| | Turbidity (48 hrs) | None |
| | Cloudiness (48 hrs) | None |
| Storage and Stability Test 3.2.4.1 | Precipitation (24 hrs) | None |
| | Phase Separation (24 hrs) | None |
| | Turbidity (24 hrs) | None |
| | Cloudiness (24 hrs) | None |
| | Precipitation (48 hrs) | None |
| | Phase Separation (48 hrs) | None |
| | Turbidity (48 hrs) | None |
| | Cloudiness (48 hrs) | None |

To verify that the nontoxic, landfillable sludge 102 was in fact nontoxic, the following tests were performed:

Testing was performed by a laboratory accredited by the American Industrial Hygiene Association. The method blanks and laboratory control spikes met EPA method and/or laboratory quality control objectives for the analyses disclosed. A sample of nontoxic, landfillable sludge 102 (such sample hereinafter referred to as Sample B) was provided and tested by TCLP (Toxicity Characteristic Leaching Procedure). The reported results are shown below in Table 5. The Cadmium, Chromium, and Lead levels were all clearly below the limits provided by SW1311/6010B (the TCLP for metals). The presence and levels of Volatile Compounds were tested by Gas Chromatography-Mass Spectometry after a 10-fold dilution of Sample B. The reported results are shown in Table 5. The levels of the reported volatile compounds for each reported compound were below the limits provided by SW8260B (a volatile compound testing specification).

TABLE 5

Environmental Testing of Sample B

| Test | | Result | Dilution Factor |
| --- | --- | --- | --- |
| ICP Metals, TCLP Leached (SW 1311/6010B) | Cd | <0.25 mg/L | 1 |
| | Cr | <0.504.7 mg/L | 1 |
| | Pb | 4.7 mg/L | 1 |
| Volatiles By GC/MS (SW8260B) | Benzene | <0.50 mg/Kg | 10 |
| | Ethylbenzene | <0.50 mg/Kg | 10 |
| | m,p-Xylene | <1.0 mg/Kg | 10 |
| | o-Xylene | <0.50 mg/Kg | 10 |
| | Toluene | <0.50 mg/Kg | 10 |
| | Surr: 4-Bromofluoro-benzene | 78.2% REC | 10 |
| | Surr: Dibromofluoro-methane | 8.20% REC | 10 |
| | Surr: Toluene-d8 | 70.6% REC | 10 |

Although applicant has described applicant's preferred embodiments of this invention, it will be understood that the broadest scope of this invention is limited only by the below claims as read in connection with the above specification. Further, many other advantages of applicant's invention will be apparent to those skilled in the art from the above descriptions and the below claims.

What is claimed is:

1. A method, relating to purifying used antifreeze comprising glycol, water, additives, and impurities, comprising the steps of:
   a) applying heat to at least one boiler;
   b) applying vacuum to the at least one boiler;
   c) adding used antifreeze to the at least one boiler;
   d) boiling off water from the used antifreeze into at least one first tank, using the at least one boiler;
   e) boiling off water and glycol from the used antifreeze into at least one second tank, using the at least one boiler;
   f) shutting off the supply of used antifreeze into the boiler;
   g) boiling off additional water and glycol from such used antifreeze into the at least one second tank, while simultaneously scraping at least one inside surface of the at least one boiler, until the impurities are concentrated;
   h) releasing the vacuum from such at least one boiler;
   i) dumping the impurities from the at least one boiler; and
   j) allowing the impurities to cool to ambient temperature, whereby at least one nontoxic, landfillable sludge is formed.

2. The method, according to claim 1, further comprising the step of opening at least one port at the bottom of the at least one boiler prior to the step of dumping such impurities from the at least one boiler.

3. The method, according to claim 1, further comprising the step of shutting off the supply of heat to the at least one boiler before the step of dumping the impurities from the at least one boiler.

4. The method, according to claim 1, further comprising the step of certifying the at least one nontoxic, landfillable sludge as nontoxic waste.

5. The method, according to claim 1, further comprising the step of certifying the at least one nontoxic, landfillable sludge as landfillable waste.

6. The method, according to claim 1, further comprising the step of disposing of the at least one nontoxic, landfillable sludge in at least one landfill.

7. The method, according to claim 1, further comprising the step of disposing of the at least one nontoxic, landfillable sludge in at least one public landfill.

8. The method, according to claim 1, further comprising the step of converting the water and glycol from the at least one second tank into sellable antifreeze.

9. The method, according to claim 1, further comprising the step of adding water to the water and glycol from the at least one second tank to generate a mixture comprising about fifty volume percent water and about fifty volume percent glycol.

10. The method, according to claim 9, further comprising the step of adding at least one anti-corrosion additive to the mixture.

11. The method, according to claim 1, wherein the step of adding used antifreeze to the at least one boiler occurs during the step of boiling off water from the used antifreeze into at least one first tank and during the step of boiling off water and glycol from the used antifreeze into at least one second tank.

12. The method, according to claim 1, wherein the step of boiling off water from the used antifreeze into at least one first tank is performed while distilled water, and not glycol, is evaporating from the used antifreeze.

13. The method, according to claim 1, wherein the step of boiling off water from the used antifreeze into at least one first tank is performed for about eight hours.

14. The method, according to claim 1, wherein the step of boiling off water and glycol from the used antifreeze into at least one second tank is performed while water and glycol are both evaporating from the used antifreeze.

15. The method, according to claim 1, wherein the step of boiling off water and glycol from the used antifreeze into at least one second tank is performed for about sixty hours.

16. The method, according to claim 1, wherein the step of dumping the impurities from the at least one boiler occurs while the impurities are about three hundred forty-five degrees Fahrenheit.

17. The method, according to claim 1, wherein the step of applying vacuum to the at least one boiler comprises the step of applying between six hundred millibars and eight hundred millibars of vacuum to the at least one boiler.

18. The method, according to claim 1, wherein the step of applying vacuum to the at least one boiler comprises the step of applying at least six hundred millibars of vacuum to the at least one boiler.

19. The method, according to claim 18, wherein the step of boiling off water from the used antifreeze into at least one first tank is performed until the used antifreeze in such boiler under the vacuum reaches a temperature of about two hundred thirty-five degrees Fahrenheit.

20. The method, according to claim 18, wherein the step of boiling off water and glycol from the used antifreeze into at least one second tank is performed after the used antifreeze in such boiler under the vacuum reaches a temperature of about two hundred thirty-five degrees Fahrenheit.

21. The method, according to claim 18, wherein the step of boiling off water and glycol from the used antifreeze into at least one second tank is performed until the used antifreeze in such boiler under the vacuum reaches a temperature of about two hundred fifty-five degrees Fahrenheit.

22. The method, according to claim 18, wherein the step of boiling off additional water and glycol from the used antifreeze into the at least one second tank until the impurities are concentrated into thick liquid is performed in the boiler under the vacuum between about three hundred twenty-five degrees Fahrenheit and about three hundred forty-five degrees Fahrenheit.

23. The method, according to claim 1, further comprising the step of filtering the used antifreeze prior to the step of adding used antifreeze to the at least one boiler.

24. The method, according to claim 1, further comprising the step of settling the used antifreeze prior to the step of adding used antifreeze to the at least one boiler.

25. The method, according to claim 1, further comprising the step of carbon-filtering the water and glycol from the second tank.

26. The method, according to claim 1, wherein the step of adding used antifreeze to the at least one boiler and the step of dumping the at least one nontoxic, landfillable sludge from the at least one boiler occur about three days apart.

27. The method, according to claim 1, further comprising the step of reducing the amount of glycol lost in-process to less than about one percent of the volume of the used antifreeze.

28. The method, according to claim 1, further comprising the step of generating a volume of such at least one nontoxic, landfillable sludge that is less than four percent of the volume of the used antifreeze.

29. The method, according to claim 1, further comprising the step of intermittently scraping the inside surface of the at least one boiler while heat is being applied to the at least one boiler.

30. The method, according to claim 1, further comprising the step of continuously scraping the inside surface of the at least one boiler while heat is being applied to the at least one boiler.

31. The method, according to claim 1, further comprising the steps of:
  a) settling the used antifreeze prior to the step of adding used antifreeze to the at least one boiler;
  b) disposing of the at least one nontoxic, landfillable sludge in at least one landfill;
  c) carbon-filtering the water and glycol from the second tank; and
  d) converting the water and glycol from the at least one second tank into sellable antifreeze;
  e) wherein the step of adding used antifreeze to the at least one boiler occurs during the step of boiling off water from the used antifreeze into at least one first tank and during the step of boiling off water and glycol from the used antifreeze into at least one second tank;
  f) wherein the step of boiling off water from the used antifreeze into at least one first tank is performed while distilled water, and not glycol, is evaporating from the used antifreeze;
  g) wherein the step of boiling off water and glycol from the used antifreeze into at least one second tank is performed while water and glycol are both evaporating from the used antifreeze;

h) wherein the step of boiling off additional water and glycol from the used antifreeze into the at least one second tank until the impurities are concentrated is performed in the boiler under the vacuum between about three hundred twenty-five degrees Fahrenheit and about three hundred forty-five degrees Fahrenheit;

i) wherein the step of dumping such impurities from the at least one boiler occurs while the impurities are about three hundred forty-five degrees Fahrenheit.

32. A distillation method, relating to purifying used antifreeze comprising glycol, water, additives, and impurities, comprising the steps of:

a) distilling the used antifreeze, in at least one simple-distillation apparatus comprising at least one boiler, until substantially all glycol is distilled from the impurities;

b) scraping the inside surface of the at least one boiler during the distillation;

c) allowing the impurities to cool to ambient temperature, whereby at least one nontoxic, landfillable sludge is formed;

d) collecting at least one first distillate comprising less than about 45 percent glycol and comprising more than about 55 percent water;

e) collecting at least one second distillate comprising less than about 45 percent water and comprising more than about 55 percent glycol; and f) mixing said at least one first distillate and said at least one second distillate to generate at least one third distillate.

33. The method, according to claim 32, wherein said at least one third distillate comprises about 50 percent water and comprises about 50 percent glycol.

34. The method, according to claim 32, wherein said at least one third distillate comprises less than about 60 percent water and comprises more than about 40 percent glycol.

* * * * *